US012753913B2

(12) United States Patent
Agrawal et al.

(10) Patent No.: US 12,753,913 B2
(45) Date of Patent: Oct. 6, 2026

(54) FLEXIBLE ELECTRONIC DISPLAY WITH CONTEXTUAL ILLUMINATION

(71) Applicant: Motorola Mobility LLC, Chicago, IL (US)

(72) Inventors: Amit Kumar Agrawal, Bangalore (IN); Panduranga Reddy Pailla, Bangalore (IN); Vijayprakash Idlur, Bangalore (IN)

(73) Assignee: Motorola Mobility LLC

( * ) Notice: Subject to any disclaimer, the term of this patent is extended or adjusted under 35 U.S.C. 154(b) by 0 days.

(21) Appl. No.: 18/899,019

(22) Filed: Sep. 27, 2024

(65) Prior Publication Data

US 2026/0092698 A1 Apr. 2, 2026

(51) Int. Cl.

| | |
|---|---|
| ***F21V 23/04*** | (2006.01) |
| ***F21V 33/00*** | (2006.01) |
| ***H04M 1/02*** | (2006.01) |
| ***H04M 1/22*** | (2006.01) |
| ***H04N 23/56*** | (2023.01) |

(52) U.S. Cl.

CPC ...... *F21V 23/0492* (2013.01); *F21V 33/0052* (2013.01); *H04M 1/0268* (2013.01); *H04M 1/22* (2013.01); *H04N 23/56* (2023.01); *H04M 2250/52* (2013.01)

(58) Field of Classification Search

CPC . F21V 23/0492; F21V 33/0052; H04N 23/56; H04M 1/0268; H04M 1/22

See application file for complete search history.

(56) References Cited

U.S. PATENT DOCUMENTS

| | | | | |
|---|---|---|---|---|
| 9,639,177 | B2 * | 5/2017 | Kim | G06F 3/1431 |
| 10,015,863 | B2 | 7/2018 | Chen | |
| 10,813,193 | B1 | 10/2020 | Agrawal et al. | |
| 11,068,074 | B2 * | 7/2021 | Lee | H04M 1/0214 |
| 11,204,616 | B2 | 12/2021 | Baker et al. | |
| 11,710,463 | B1 | 7/2023 | Ito et al. | |
| 11,966,659 | B2 | 4/2024 | Agrawal et al. | |

(Continued)

FOREIGN PATENT DOCUMENTS

| | | | |
|---|---|---|---|
| KR | 20240171952 | A | 12/2024 |
| WO | 2022124734 | A1 | 6/2022 |

OTHER PUBLICATIONS

"Non-Final Office Action", U.S. Appl. No. 18/898,901, filed May 15, 2025, 10 pages.

(Continued)

*Primary Examiner* — Bryon T Gyllstrom

(74) *Attorney, Agent, or Firm* — FIG. 1 Patents

(57) ABSTRACT

In aspects of a flexible electronic display with contextual illumination, a mobile device includes at least the flexible electronic display and an illumination controller that determines whether the mobile device is in a self-standing configuration. In the self-standing configuration, one or more electronic displays of the mobile device may be oriented toward a surface on which the mobile device is located. The illumination controller controls and adjusts an illumination output of the one or more electronic displays of the mobile device based on one or more illumination control parameters. The illumination control parameters may include a detected sleep stage of a user, ambient light, and/or a location of the mobile device.

20 Claims, 11 Drawing Sheets

(56) References Cited

U.S. PATENT DOCUMENTS

| | | | | |
|---|---|---|---|---|
| 12,271,223 | B2 | 4/2025 | Choi et al. | |
| 2009/0158628 | A1* | 6/2009 | Ashley .................... | G09F 19/22<br>40/541 |
| 2009/0183409 | A1* | 7/2009 | Thomas .............. | G09F 15/0062<br>40/610 |
| 2012/0139815 | A1* | 6/2012 | Aono .................... | G06F 1/1616<br>345/1.3 |
| 2013/0145311 | A1* | 6/2013 | Joo ....................... | G06F 3/0487<br>715/788 |
| 2014/0049463 | A1* | 2/2014 | Seo ....................... | G06F 1/1694<br>345/156 |
| 2014/0049464 | A1* | 2/2014 | Kwak ..................... | G06F 3/017<br>345/156 |
| 2016/0247366 | A1* | 8/2016 | Munoz ..................... | G08B 5/36 |
| 2019/0298255 | A1 | 10/2019 | Dong | |
| 2020/0098300 | A1 | 3/2020 | Verma et al. | |
| 2022/0236940 | A1* | 7/2022 | Adsett ................... | G06F 1/1656 |
| 2022/0261093 | A1* | 8/2022 | Zhang ................... | G06F 1/1652 |
| 2024/0307252 | A1 | 9/2024 | Lim et al. | |
| 2026/0087958 | A1 | 3/2026 | Kim et al. | |
| 2026/0095994 | A1 | 4/2026 | Agrawal et al. | |

OTHER PUBLICATIONS

Agrawal, Amit Kumar , et al., "Pursuant to MPEP § 2001.06(b) the applicant brings the following co-pending application to the Examiner's attention:", U.S. Appl. No. 18/899,019, filed Sep. 27, 2024, 58 pages.

Agrawal, Amit Kumar , et al., "Pursuant to MPEP § 2001.06(b) the applicant brings the following co-pending application to the Examiner's attention:", U.S. Appl. No. 18/898,901, filed Sep. 27, 2024, 59 pages.

Mertens, Ron , "Samsung flexible-display watch design patent surface", OLED-Info: the OLED experts [online] [retrieved Sep. 3, 2024]. Retrieved from the Internet <https://www.oled-info.com/samsung-flexible-display-watch-design-patent-surface>., Aug. 4, 2013, 4 Pages.

Nubia, "nubia Z50S Pro", Nubia Technology Co., Ltd. [retrieved Sep. 3, 2024]. Retrieved from the Internet <https://intl.nubia.com/products/nubia-z50s-pro>., Jul. 20, 2023, 7 Pages.

Rojas Soriano, Eduardo , "Screen Flashlight", Google Play Store [retrieved Sep. 3, 2024]. Retrieved from the Internet <https://play.google.com/store/apps/details?id=com.eduardo_rsor.apps.linternapantalla&hl=en&gl=US>., May 13, 2015, 4 Pages.

Unbox Therapy , "The Most Futuristic Flexible Display Phone", YouTube Video uploaded by Unbox Therapy [online][retrieved Sep. 3, 2024]. Retrieved from the Internet <https://www.youtube.com/watch?v=JbY8DM8c-h0&t=292s>., Mar. 29, 2019, 3 Pages.

Zodiaa , "6in1 Ultra-Smart Night Lamp", Zodiaa, Zodiaa.com [retrieved Sep. 3, 2024]. Retrieved from the Internet <https://web.archive.org/web/20230221222303/https://zodiaa.com/products/6in1-ultra-smart-night-lamp>., Feb. 21, 2023, 4 Pages.

Final Office Action issued in U.S. Appl. No. 18/898,901, mailed Dec. 1, 2025, 10 pages.

Non-Final Office Action issued in U.S. Appl. No. 18/898,901, mailed May 20, 2026, 11 pages.

* cited by examiner

FLEXIBLE ELECTRONIC DISPLAY WITH CONTEXTUAL ILLUMINATION

BACKGROUND

Electronic devices, such as smartphones and other mobile devices, sometimes include directional lights integrated with camera lenses or other features. For example, a smartphone may include a camera feature that enables the smartphone to capture images of a subject. The camera feature may include a flash emitter that generates light in a direction of the subject while the subject is photographed. Such devices sometimes additionally include user interface features that enable the flash emitter to be activated in situations that are unrelated to photographing a subject. For instance, some smartphones support activation of the flash emitter for use as a directional flashlight. However, in situations in which a diffuse or subdued light is appropriate, the light emitted by a flash emitter is too directional and/or too intense for practical use. Further, such features may have a binary on/off control for activation and deactivation which may limit the use of such features in situations in which manual operation of the smartphone is difficult or not possible. These technical shortcomings can lead to user frustration.

BRIEF DESCRIPTION OF THE DRAWINGS

Implementations of the techniques for a mobile device including a flexible electronic display with contextual illumination are described with reference to the following Figures. The same numbers may be used throughout to reference like features and components shown in the Figures.

DETAILED DESCRIPTION

Figure 1:
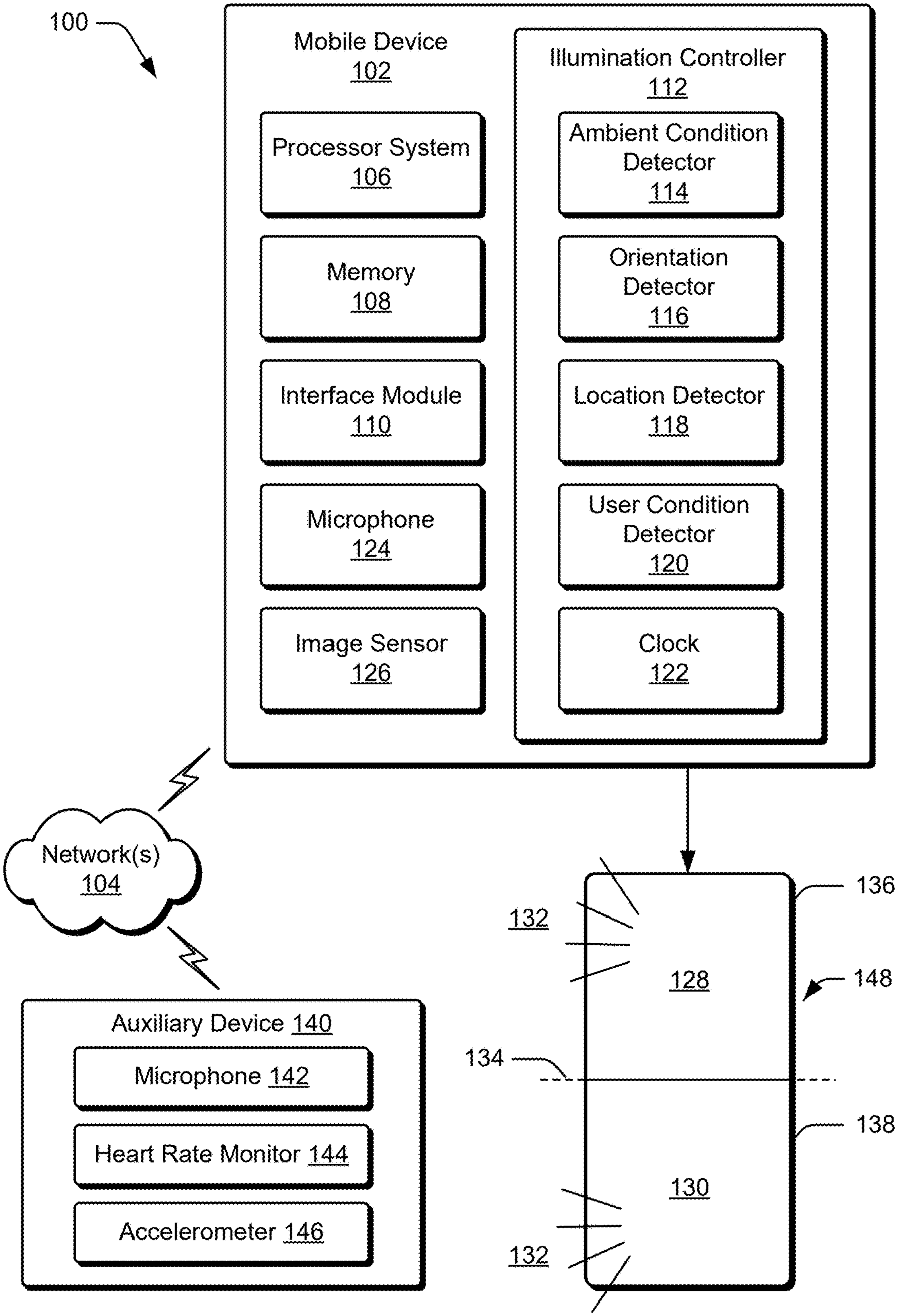
FIG. 1 illustrates an example system for a flexible electronic display with contextual illumination, in accordance with one or more implementations as described herein.

Implementations of the techniques for a mobile device that includes a flexible electronic display with contextual illumination may be implemented as described herein. A mobile device, such as any type of a wireless device, media device, mobile phone, flip phone, client device, tablet, computing, communication, entertainment, gaming, media playback, and/or any other type of computing, consumer, and/or electronic device, or a system of any combination of such devices, can be configured to perform techniques for a flexible electronic display with contextual illumination, as described herein. In one or more implementations, a mobile device includes an illumination controller, which can be used to implement aspects of the techniques described herein.

Mobile devices such as smartphones sometimes include illumination features such as directional light-emitting diodes (LEDs). The illumination features can be used for capturing images and/or as an improvised directional flashlight. However, such illumination features are often not suitable for situations in which a diffused light is desired. For example, some users may attempt to use the illumination features of a mobile device as a flashlight to navigate through a dark room. However, in such situations, the light emitted by the illumination features may be highly directional and emitted at a high intensity. This can cause discomfort and/or disorientation of the user, particularly if the user was previously asleep. Additionally, it may be difficult for a user to locate the mobile device within the room and manually activate the illumination features due to the lack of visibility. In some situations the user may instead interact with a button or touchscreen of the mobile device to turn on a front-facing display screen of the mobile device for illumination. However, this approach may also result in a light that is too intense, particularly for sleeping. As the buttons or touchscreen to activate the display screen are often proximate to the display screen (e.g., at a same side of the device as the display screen), the emitted light is likely to be directed toward the face of the user or another undesired direction rather than the desired areas of the room. This may impede the vision of the user.

Some conventional approaches to address these issues include standalone nightlight devices that can be arranged at a fixed location within a room. However, such devices can often occupy space within the room that could otherwise be utilized for other items. Further, such devices often have limited customization options, may not include a user-friendly interface, and/or may rely on a dedicated power source such as a wall electrical outlet. Such devices can also suffer from the issue of manual activation described above and may keep a user awake if the emitted light is too intense and/or is not manually deactivated by the user.

In order to address these technical challenges, the techniques described herein implement a flexible electronic display with contextual illumination that can be implemented in a mobile device. In one or more implementations, the mobile device includes an illumination controller that determines whether the mobile device is in a self-standing configuration. In the self-standing configuration, one or more electronic displays of the device can be oriented toward a surface on which the device sits. While the device is in the self-standing configuration, the illumination controller adjusts an illumination of the one or more electronic displays of the device based on one or more illumination control parameters. The illumination control parameters can include a detected sleep stage of a user, ambient light, and/or a precise location of the device within a space, such as a room.

Adjusting the illumination of the one or more electronic displays includes, in some implementations, increasing or maintaining the illumination output while the user is awake and decreasing the illumination output as the user falls asleep. The illumination controller thus controls the illumination output automatically to provide a desired level of light within the space while the mobile device is in the self-standing configuration. The light emitted can be incident to the surface on which the device sits in order to provide a diffuse light quality. Further, when the user is awake and the device is adjusted to a different configuration, the illumination controller can automatically halt the illumination output that was based on the illumination control parameters. As a result, the device is able to provide a comfortable illumination output automatically without human intervention, thereby increasing user comfort and alleviating issues associated with manual activation. Additionally, in conditions in which the illumination output is provided, access to other functionality of the device can be maintained, such as functionality relating to media streaming, text messaging, phone calls, games, etc. Thus, the device automatically provides illumination output appropriate for a variety of conditions, and user comfort is increased.

While features and concepts of the described techniques for a flexible electronic display with contextual illumination is implemented in any number of different devices, systems, environments, and/or configurations, implementations of the techniques for a flexible electronic display with contextual illumination are described in the context of the following example devices, systems, and methods.

FIG. 1 illustrates an example system 100 for a flexible electronic display with contextual illumination, as described herein. The example system 100 includes a mobile device 102 and a communication network 104. Examples of the mobile device 102 include at least one of any type of a wireless device, mobile phone, flip phone, smartphone, client device, companion device, tablet, computing device, communication device, entertainment device, gaming device, media playback device, and/or any other type of computing, consumer, and/or electronic device.

The mobile device 102 can be implemented with various components, such as a processor system 106 and a memory 108, as well as any number and combination of different components as further described with reference to the example device shown in FIG. 18. In implementations, the mobile device 102 includes various radios for wireless communication with other devices. For example, the system and devices can include a Bluetooth (BT) and/or Bluetooth Low Energy (BLE) transceiver, as well as a near field communication (NFC) transceiver. In some cases, the system and devices includes at least one of a WiFi radio, a cellular radio, a global positioning satellite (GPS) radio, or any available type of device communication interface.

In some implementations, the devices, applications, modules, servers, and/or services described herein communicate via the communication network 104, such as for data communication with the mobile device 102. The communication network 104 includes a wired and/or a wireless network. The communication network 104 can be implemented using any type of network topology and/or communication protocol, and is represented or otherwise implemented as a combination of two or more networks, to include IP-based networks, cellular networks, and/or the Internet. The communication network 104 includes mobile operator networks that are managed by a mobile network operator and/or other network operators, such as a communication service provider, mobile phone provider, and/or Internet service provider.

The mobile device 102 includes various functionality that enables the device to implement different aspects of a flexible electronic display with contextual illumination, as described herein. In one or more examples, an interface module 110 represents functionality (e.g., logic and/or hardware) enabling the mobile device 102 to interconnect and interface with other devices and/or networks, such as the communication network 104. For example, the interface module 110 enables wireless and/or wired connectivity of the mobile device 102.

The mobile device 102 can include and implement various device applications, such as any type of messaging application, email application, video communication application, cellular communication application, music/audio application, gaming application, media application, social platform applications, and/or any other of the many possible types of various device applications. Many of the device applications have an associated application user interface that is generated and displayed for user interaction and viewing, such as on a display screen (e.g., also referred to herein as a display device or an electronic display) of the mobile device 102. Generally, an application user interface, or any other type of video, image, graphic, and the like is digital image content that is displayable on the display screen of the mobile device 102.

In the example system 100 for a flexible electronic display with contextual illumination, the mobile device 102 implements an illumination controller 112 (e.g., as a device application). As shown in this example, the illumination controller 112 represents functionality (e.g., logic, software, and/or hardware) enabling aspects of the described techniques for a flexible electronic display with contextual illumination. The illumination controller 112 can be implemented as computer instructions stored on computer-readable storage media and can be executed by the processor system 106 of the mobile device 102. Alternatively, or in addition, the illumination controller 112 can be implemented at least partially in hardware of the device.

In one or more implementations, the illumination controller 112 includes independent processing, memory, and/or logic components functioning as a computing and/or electronic device integrated with the mobile device 102. Alternatively, or in addition, the illumination controller 112 can be implemented in software, in hardware, or as a combination of software and hardware components. In this example, the illumination controller 112 is implemented as a software application or module, such as executable software instructions (e.g., computer-executable instructions) that are executable with the processor system 106 of the mobile device 102 to implement the techniques and features described herein. As a software application or module, the illumination controller 112 can be stored on computer-readable storage memory (e.g., the memory 108 of a device), or in any other suitable memory device or electronic data storage implemented with the controller. Alternatively or in addition, the illumination controller 112 is implemented in firmware and/or at least partially in computer hardware. For example, at least part of the illumination controller 112 is executable by a computer processor, and/or at least part of the illumination controller is implemented in logic circuitry.

In this example system 100, the illumination controller 112 receives electronic communications from various other components included in the system 100 and performs operations based on the received communications. For example, the system 100 is depicted including an ambient condition detector 114, an orientation detector 116, a location detector 118, a user condition detector 120, a clock 122, a microphone 124, and an image sensor 126. The illumination controller 112 can receive input from one or more of these components. Based on the received input, the illumination controller 112 can output signals (e.g., electronic signals) to electronic displays of the mobile device 102 such as first electronic display 128 and/or second electronic display 130 to control an illumination output of the mobile device 102 according to the techniques described herein. The first electronic display 128 and the second electronic display 130 may be referred to herein as a first display screen and a second display screen, respectively. In alternative implementations, the first electronic display 128 and the second electronic display 130 form one flexible electronic display of the mobile device 102.

In example implementations, the microphone 124 can detect and/or measure acoustical waves incident to the mobile device 102 and can provide data describing the acoustical waves as input to the illumination controller 112. The data describing the acoustical waves can indicate an amplitude of the waves (e.g., decibel level), frequency of the waves, etc.

As another example implementation, the image sensor 126 can detect and/or measure light incident to the mobile device 102 and can provide data describing the light as input to the illumination controller 112 (e.g., an intensity of the light, a wavelength of the light, etc.). In some instances, the image sensor 126 can generate one or more images via a lens of the mobile device 102 (not shown), and the generated images can be provided as input to the illumination controller 112.

The ambient condition detector 114 included by the illumination controller 112 can receive the input from the microphone 124 and/or from the image sensor 126 and can determine ambient conditions surrounding the mobile device 102 based on the input. For example, the ambient condition detector 114 can determine an amount of light (e.g., a light level in lumens) within a room containing the mobile device 102, a sound level (e.g., a decibel level) within the room, etc. The illumination controller 112 can perform operations and determinations related to controlling an illumination output 132 of the one or more display screens of the mobile device 102 based on the ambient conditions (e.g., increase or decrease the illumination output according to the ambient light level and/or ambient sound level).

Additionally and/or alternatively, the user condition detector 120 can receive electronic communications (e.g., input) from the microphone 124 and/or the image sensor 126 and determine a condition of a user based on the received communications. For example, the user condition detector 120 can determine whether a user proximate to the mobile device 102 is awake (e.g., in an awake stage in which the user is not sleeping), asleep (e.g., in a transitional sleep stage not associated with rapid eye movement), or in a deep sleep (e.g., in a deep sleep stage associated with rapid eye movement, also referred to as REM sleep) based on acoustic levels detected and/or measured by the microphone 124, and/or based on light levels and/or image data measured or generated (respectively) by the image sensor 126. In some implementations, the user condition detector 120 employs one or more algorithms that receive signals (e.g., electronic signals) from the microphone 124, the image sensor 126, and/or the clock 122 as input, and the one or more algorithms generate a user condition determination as output. For example, based on a detected light level being below a threshold level, detected acoustic waveforms approximately matching pre-determined waveforms stored in the memory 108, and a time indicated by the clock 122 being within a pre-determined range, the user condition detector 120 can determine that a user proximate to the mobile device 102 is sleeping (e.g., in the deep sleep stage). Other examples are possible.

The orientation detector 116 can be utilized by the illumination controller 112 to detect an orientation of the mobile device 102. Detecting an orientation of the mobile device 102 includes detecting an angle between the electronic displays and/or housing sections of the mobile device 102. In the example shown, the first electronic display 128 and second electronic display 130 are foldably attached to each other and pivotable relative to each other around a pivot axis 134 (also referred to herein as a fold axis). In particular, the first electronic display 128 is integrated with a first housing 136 (e.g., housing portion, member, or section) of the mobile device 102, the second electronic display 130 is integrated with a second housing 138 of the mobile device 102, and the first housing 136 is pivotable relative to the second housing 138 around the pivot axis 134 to pivot (e.g. fold) the first electronic display 128 relative to the second electronic display 130.

The orientation detector 116 can utilize one or more sensors (e.g., rotation sensors, position sensors, etc.) to detect a rotation of the first electronic display 128 relative to the second electronic display 130 (or vice versa). In some implementations, the orientation detector 116 determines the particular angle between the first electronic display 128 and the second electronic display 130. For example, the orientation detector 116 determines whether the angle between the first electronic display 128 and the second electronic display 130 is larger or smaller than a threshold angle, or is within a threshold angle range. The threshold angle may be an angle associated with a transition of the mobile device 102 from an open configuration or a closed configuration to a self-standing configuration. As non-limiting examples, the threshold angle may be forty-five degrees, thirty degrees, or the threshold angle range may be between thirty degrees and forty-five degrees inclusive. Thus, the detected angle can be one of the multiple illumination control parameters used by the illumination controller 112 to control the illumination output of the one or more display screens of the mobile device 102. For example, responsive to determining that the detected angle corresponds to the mobile device 102 being in the self-standing configuration, the illumination controller 112 can control the illumination output as described herein.

The illumination controller 112 utilizes the location detector 118 to determine a location of the mobile device 102 within an environment or in a space, e.g., a room. The location detector 118 can determine the location of the mobile device 102 with a high amount of precision. For example, the location detector 118 can determine the location of the mobile device 102 within a range of one centimeter from the actual location of the mobile device 102. In some implementations, the location detector 118 employs ultra-wideband (UWB) communications and/or Bluetooth® communications to determine the location of the mobile device 102. As one example, the mobile device 102 can be connected to the communication network 104, and the location detector 118 can utilize the above-described communications to communicate with a network device (e.g., router, modem, etc.) to determine the location of the mobile device 102 relative to the network device.

The detected location of the mobile device 102 can be utilized by the illumination controller 112 in performing the techniques described herein. For example, the location of the mobile device 102 can be one of the multiple illumination control parameters used by the illumination controller 112 to control the illumination output of the mobile device 102. As one non-limiting example, the illumination controller 112 can determine whether the mobile device 102 is in the self-standing configuration and whether the mobile device 102 is at a particular location, e.g., on a nightstand of a user. Responsive to confirming these conditions are satisfied, the illumination controller 112 can control the illumination output of the one or more display screens, as described herein.

In some implementations, the mobile device 102 communicates with one or more auxiliary devices over the communication network 104, such as an auxiliary device 140. In the depicted example, the auxiliary device 140 includes a microphone 142, a heart rate monitor 144, and an accelerometer 146. It should be appreciated that the components of the auxiliary device 140 are non-limiting examples, and the auxiliary device 140 can include other components without departing from the scope of the described techniques.

In some implementations, the auxiliary device 140 can be a wearable electronic device such as a smartwatch, activity tracker, or user health monitor. The auxiliary device 140 can acquire data describing a condition of a user (e.g., a wearer of the auxiliary device), and the auxiliary device can communicate the acquired data to the mobile device 102 over the communication network 104.

The user condition detector 120 can utilize the acquired data to determine the condition of the user (e.g., whether the user is in the awake stage, a transitional sleep stage, the deep sleep stage, walking, prone, etc.). For example, the user condition detector 120 can determine whether the user is moving or is stationary based on the data acquired by the accelerometer 146 and provided to the mobile device 102. As another example, the user condition detector 120 can determine whether the user is active or resting (e.g., sleeping) based on the data acquired by the heart rate monitor 144 and provided to the mobile device 102. In some situations, the heart rate of the user detected by the heart rate monitor 144 can be used by the mobile device 102 to determine a stage of sleep of the user (e.g., whether the user is in a transitional sleep stage or the deep sleep stage). For example, during conditions in which the detected heart rate is lower than a threshold heart rate, the illumination controller 112 of the mobile device 102 can determine that the user is in the deep sleep stage. Data acquired by the microphone 142 can also be used by the user condition detector 120 to determine the condition of the user. For example, during conditions in which a decibel level of sound emitted by the user is less than a threshold level as detected by the microphone 142, the user condition detector 120 may determine that the user is resting (e.g., in a transitional sleep stage or the deep sleep stage) and/or is stationary.

In the depicted example, the mobile device 102 includes the first electronic display 128 and the second electronic display 130 which together form a flexible electronic display 148. The flexible electronic display 148 is flexible in so far that the first electronic display 128 and the second electronic display 130 are foldable (e.g., pivotable) relative to each other. In some implementations, the first electronic display 128 and the second electronic display 130 may be foldably attached to each other via a hinge (e.g., a butt hinge, a concealed barrel hinge, a living hinge formed by one or both of the first electronic display 128 and the second electronic display 130, and/or another type of hinge). Content (e.g., media, GUIs, etc.) and/or illumination can be output in a manner in which the content or illumination extends across both of the first electronic display 128 and the second electronic display 130. As a result, the first electronic display 128 and the second electronic display 130 appear to form a single unitary electronic display while the mobile device 102 is in the open configuration.

FIGS. 2-9 illustrate different views of the mobile device 102 including the flexible electronic display 148 with contextual illumination, in accordance with one or more implementations as described herein.

Figure 2:
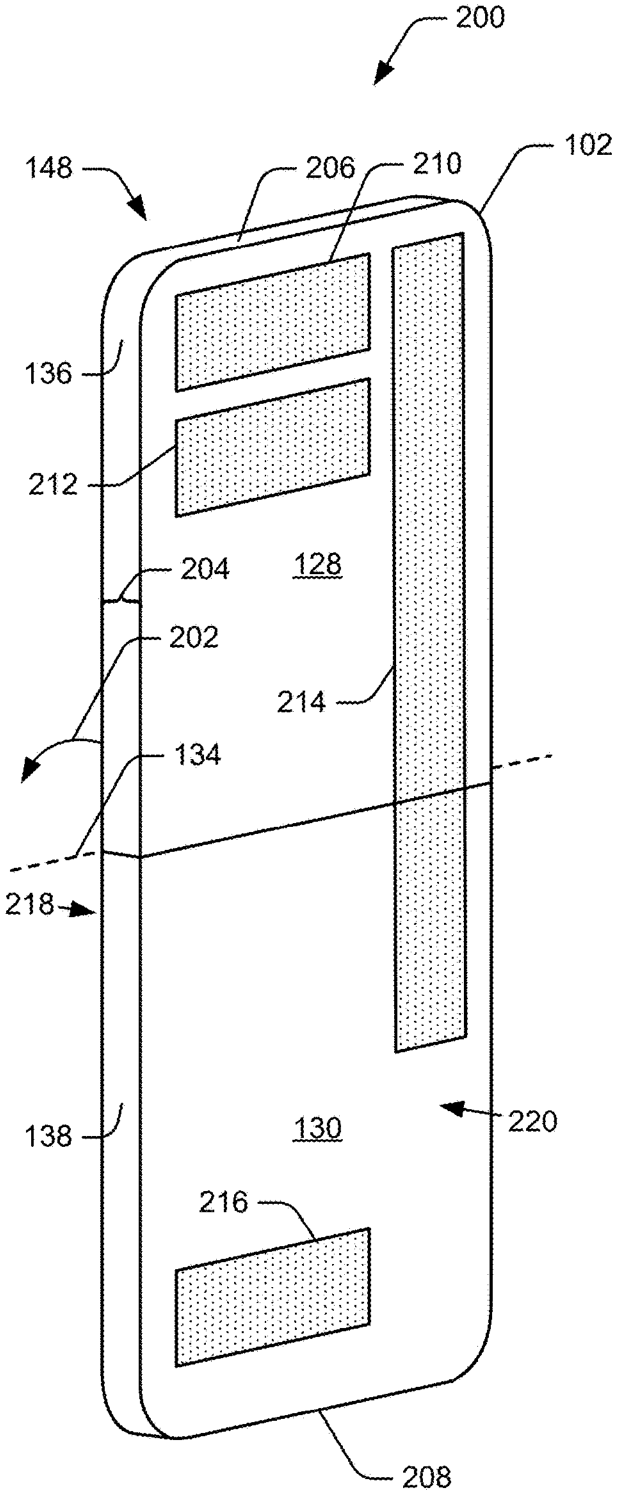
FIGS. 2-3 illustrate different views of an example mobile device that includes a flexible electronic display with contextual illumination, in accordance with one or more implementations as described herein.
Figure 3:
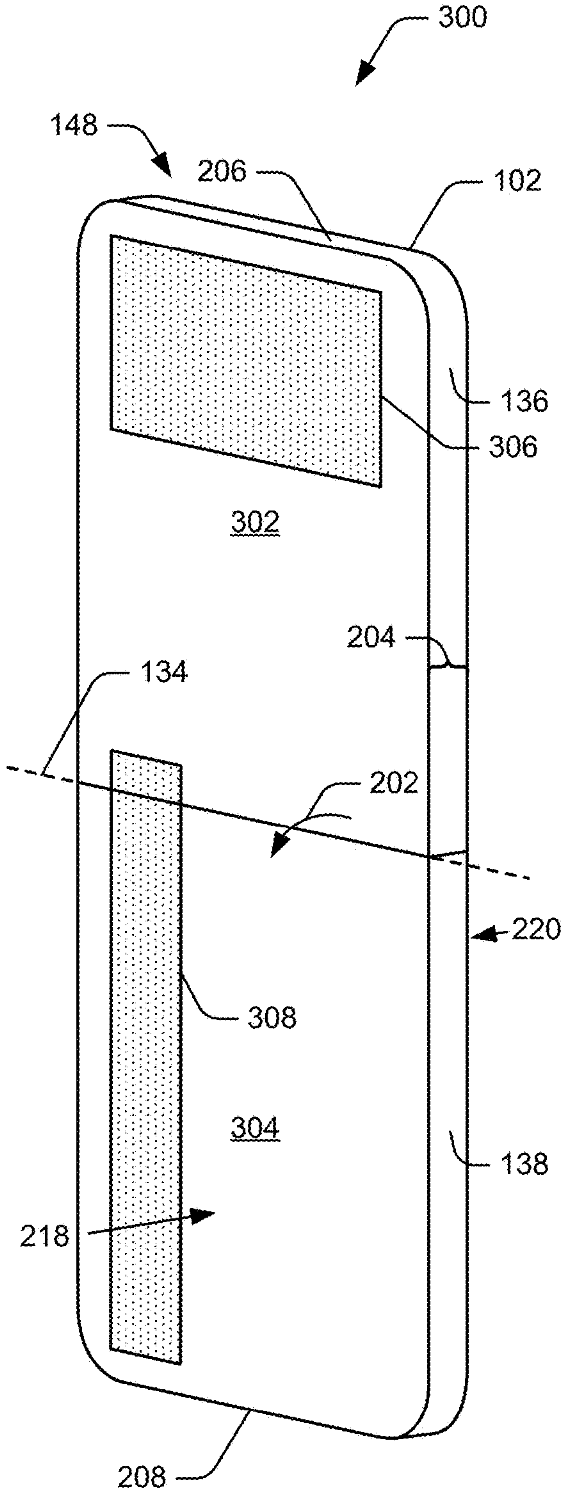
Figure 4:
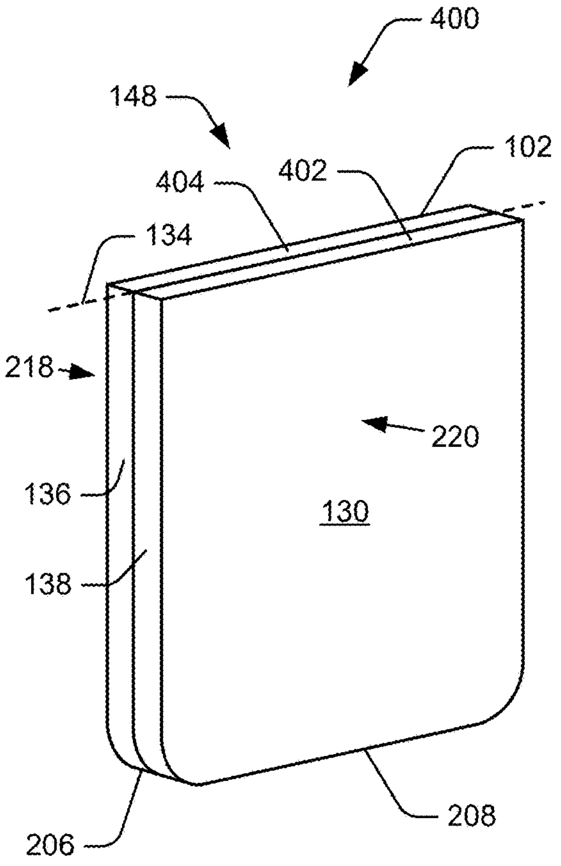
FIGS. 4-5 further illustrate different views of an example mobile device that includes a flexible electronic display with contextual illumination in a folded configuration, in accordance with one or more implementations as described herein.
Figure 5:
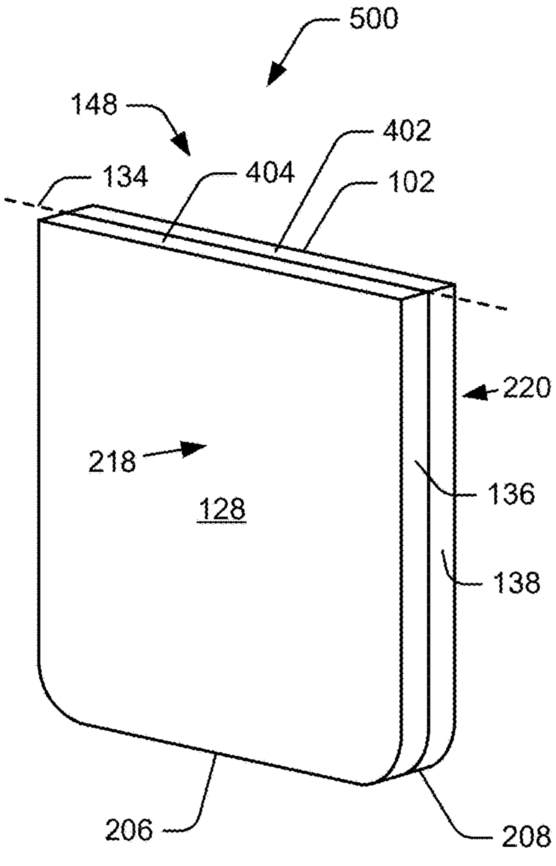
Figure 6:
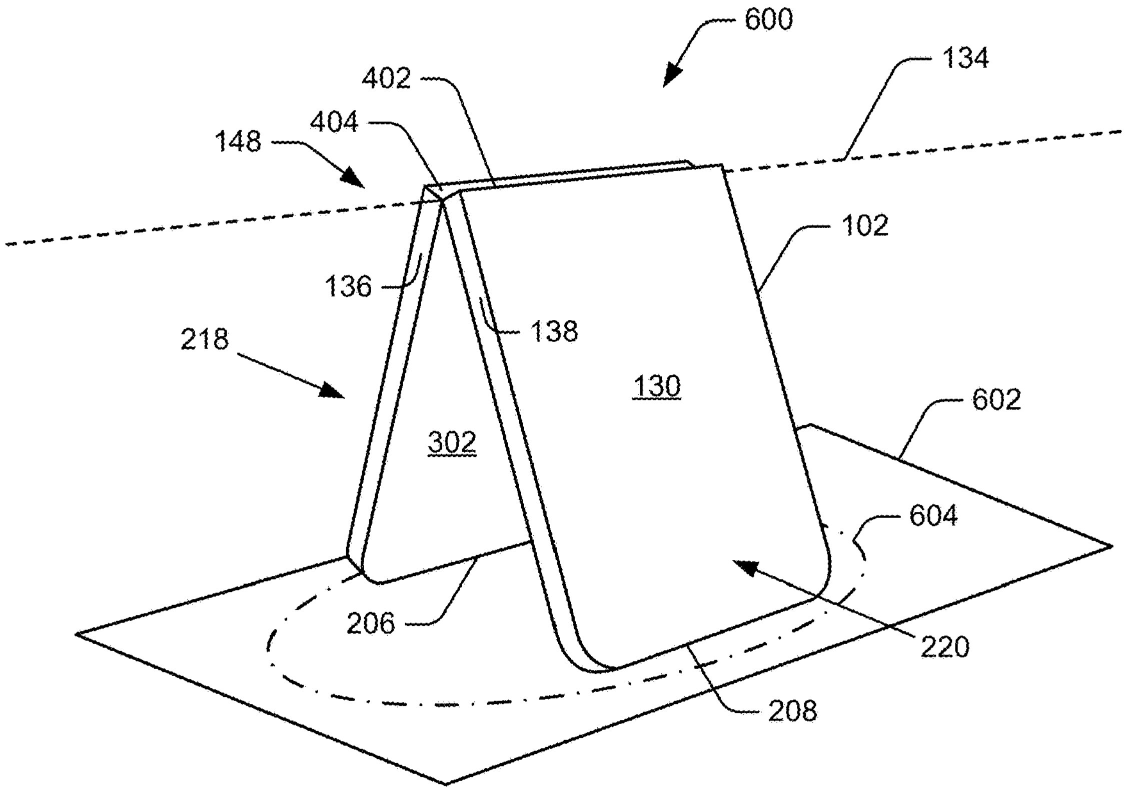
FIGS. 6-7 further illustrate different views of an example mobile device that includes a flexible electronic display with contextual illumination in a self-standing configuration, in accordance with one or more implementations as described herein.
Figure 7:
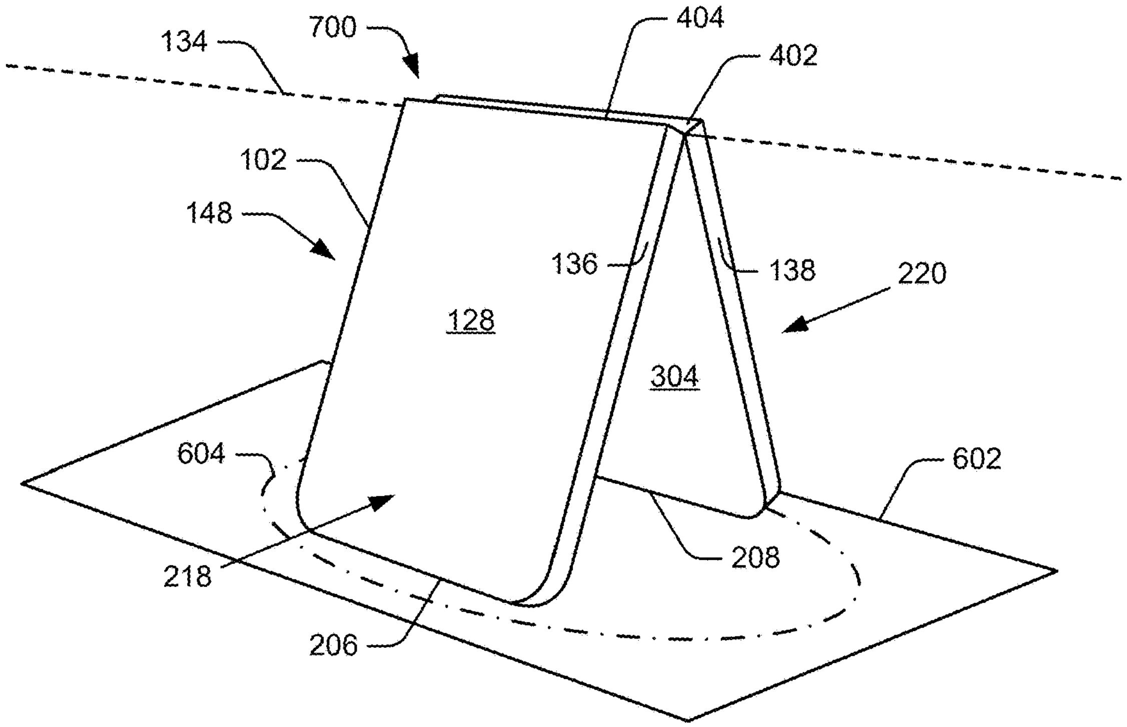
Figure 8:
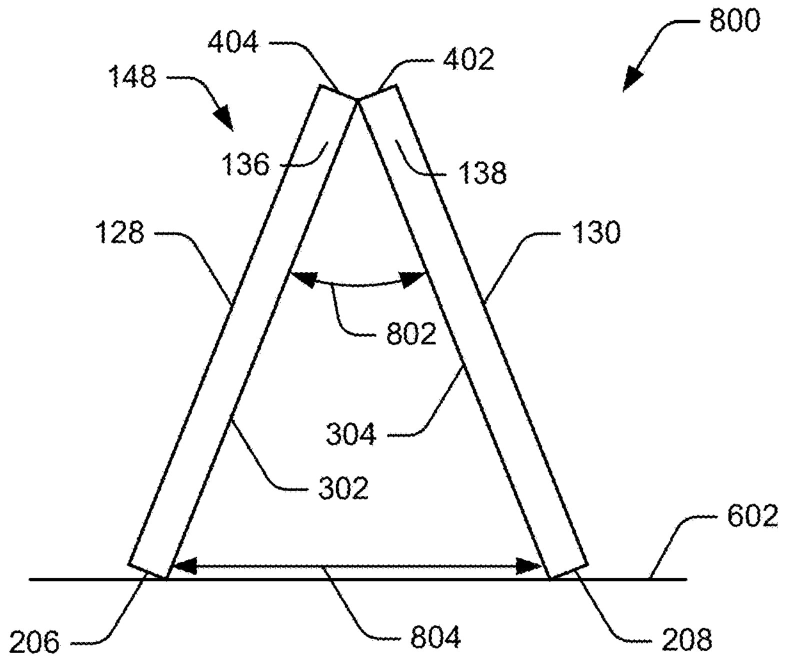
FIGS. 8-9 further illustrate an example mobile device that includes a flexible electronic display with contextual illumination in a self-standing configuration with different spacing between ends of the flexible electronic display, in accordance with one or more implementations as described herein.
Figure 9:
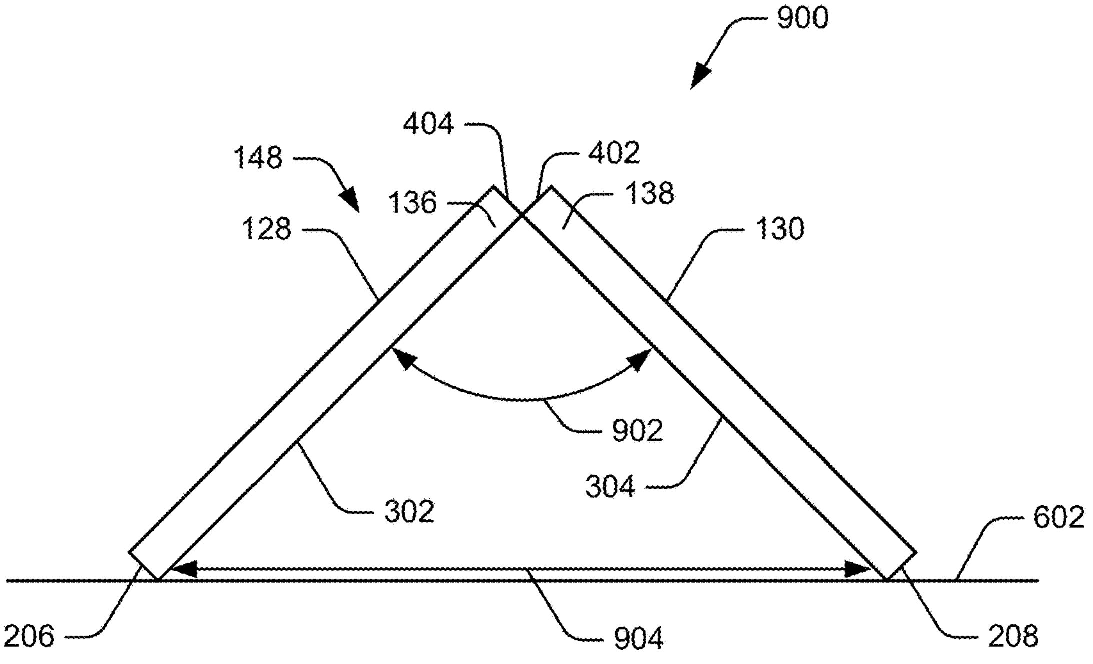

The mobile device 102 includes multiple electronic displays that are pivotable relative to each other to adjust the mobile device 102 to different configurations. Some of the possible configurations of the mobile device 102 are depicted by the figures. However, the configurations shown are non-limiting examples, and other configurations are possible. In particular, FIG. 2 and FIG. 3 depict a view 200 and a view 300 (respectively) of the mobile device 102 in an "open" configuration, FIG. 4 and FIG. 5 depict a view 400 and a view 500 (respectively) of the mobile device 102 in a "closed" configuration, and FIGS. 6-9 depict the mobile device 102 in different "self-standing" configurations. Specifically, FIG. 6, FIG. 7, and FIG. 8 depict a view 600, a view 700, and a view 800 (respectively) of the mobile device 102 in a self-standing configuration with the first electronic display 128 and the second electronic display 130 rotated relative to each other around the pivot axis 134 by a first angle 802. FIG. 9 depicts a view 900 of the mobile device 102 in a self-standing configuration with the first electronic display 128 and the second electronic display 130 rotated relative to each other around the pivot axis 134 by a second angle 902.

The examples in the figures are shown including features positioned relative to each other. If such features are shown directly contacting each other or adjacent to each other, then the features may be referred to herein as directly contacting or adjacent, respectively. Further, in the figures, features are shown spaced apart from other features, arranged to a left or right side of other features, arranged above or below other features, and so forth, and may be described as such. A "top" of a feature refers to an uppermost portion of the feature and "bottom" of a feature refers to a lowermost portion of the feature. Features shown in the drawings with particular profiles or shapes such as rounded edges, tapering, flatness, concavity, bulging, and so forth may be referred to as such. Features disposed or arranged within other features may be referred to as such. Features depicted as facing outward or facing inward may be referred to as such.

In the depicted example, the mobile device 102 includes a first electronic display 128 and a second electronic display 130 separated from each other across the pivot axis 134 of the mobile device 102. The first electronic display 128 is pivotable (e.g., rotatable) relative to the second electronic display 130 around the pivot axis 134 (e.g., in direction 202 around the pivot axis 134).

The mobile device 102 further includes a third electronic display 302, and may also include a fourth electronic display 304. The third electronic display 302 and the fourth electronic display 304 may be referred to herein as a third display screen and a fourth display screen, respectively. The third electronic display 302 is arranged parallel with the first electronic display 128 and is opposite to the first electronic display 128 across a thickness 204 of the mobile device 102. The third electronic display 302 is integrated with the first housing 136. The fourth electronic display 304 is arranged parallel with the second electronic display 130 and is opposite to the second electronic display 130 across the thickness 204 of the mobile device 102. The fourth electronic display 304 is integrated with the second housing 138. The thickness 204 can be the same at each location along the mobile device 102 in some implementations.

The illumination controller 112 of the mobile device 102 can detect whether the mobile device 102 is in the open configuration, the closed configuration, or one of the self-standing configurations based on an output of the orientation detector 116. For example, the orientation detector 116 can detect an amount of rotation of the first electronic display 128 relative to the second electronic display 130 around the pivot axis 134 (e.g., an angle between the end 206 of the first electronic display 128 and the end 208 of the second electronic display 130, such as angle 802 shown by FIG. 8 or angle 902 shown by FIG. 9) and can determine the configuration of the mobile device 102 based on the detected amount of rotation.

During operation of the mobile device 102 in the open configuration, a content output by the mobile device 102 for display can extend across two or more of the electronic displays described above. For example, the content output by the mobile device 102 can be a graphical user interface (GUI), and the GUI can be displayed using both of the first electronic display 128 and the second electronic display 130. In particular, the first electronic display 128 can display a first portion of the GUI (e.g., a first set of elements of the GUI such as panels, menus, etc.) and the second electronic display 130 can display a second portion of the GUI (e.g., a second set of elements). In some situations, a single element of the GUI can be displayed by both of the first electronic display 128 and the second electronic display 130 such that the element appears to extend from the first electronic display 128 to the second electronic display 130 (or vice versa).

As an example, FIG. 2 depicts the mobile device 102 in the open configuration. In the example, the first electronic display 128 displays GUI element 210, GUI element 212, and a portion of GUI element 214, and the second electronic display 130 displays GUI element 216 and another portion of the GUI element 214 such that the GUI element 214 appears to extend from the first electronic display 128 to the second electronic display 130. In the example depicted by FIG. 3 with the mobile device 102 in the open configuration, the third electronic display 302 displays GUI element 306 and a portion of GUI element 308, and the fourth electronic display 304 displays another portion of the GUI element 308 such that the GUI element 308 appears to extend from the third electronic display 302 to the fourth electronic display 304.

In the open configuration of the mobile device 102 depicted by FIGS. 2-3, the second electronic display 130 and the first electronic display 128 are arranged parallel and coplanar to each other and spaced apart by the pivot axis 134, while the third electronic display 302 and the fourth electronic display 304 are arranged parallel and coplanar to each other and spaced apart by the pivot axis 134. Further, in the open configuration, the first electronic display 128 and the second electronic display 130 are arranged at a first side 220 of the mobile device 102, and the third electronic display 302 and the fourth electronic display 304 are arranged at an opposing second side 218 of the mobile device 102. In this configuration, an end 206 of the first electronic display 128 is arranged opposite to an end 208 of the second electronic display 130 across a length of the mobile device 102 perpendicular to the pivot axis 134 and perpendicular to the thickness 204. Although in the open configuration the first electronic display 128, the second electronic display 130, the third electronic display 302, and the fourth electronic display 304 are each parallel to each other, the first electronic display 128 and the second electronic display 130 are not coplanar with the third electronic display 302 and the fourth electronic display 304.

Each electronic display of the mobile device 102 can display content, and in some implementations the displayed content is different for one or more of the electronic displays. For example, the first electronic display 128 and the second electronic display 130 can together display a first content (e.g., a first GUI), with some of the first content displayed by the first electronic display 128 and some of the first content displayed by the second electronic display 130. Concurrently, the third electronic display 302 and the fourth electronic display 304 can together display a second content (e.g., a second GUI), with some of the second content displayed by the third electronic display 302 and some of the second content displayed by the fourth electronic display 304. Thus, in some implementations the electronic displays can be coordinated such that the displayed content appears to extend across two or more of the electronic displays, while other electronic displays of the mobile device 102 display different content. In one non-limiting example, the first electronic display 128, the second electronic display 130, the third electronic display 302, and the fourth electronic display 304 all display different content independent of each other.

Although the display of content via the electronic displays is described above, in the implementations described herein the illumination controller 112 can control the illumination output of the electronic displays in a similar manner. For example, the illumination controller 112 can control the electronic displays on an individual basis (e.g., independent of each other) to display solid colors, gradients, patterns, or other elements that fill (or partially fill) the electronic displays to illuminate areas surrounding the mobile device 102 (e.g., a surface on which the mobile device 102 sits). For example, the illumination controller 112 can control the illumination output by the electronic displays in order to support the use of the mobile device 102 as a lamp or nightlight while the mobile device 102 is in the self-standing configuration, as described further below.

In the open configuration of the mobile device 102 depicted by FIGS. 2-3, each of the electronic displays included by the mobile device 102 face outward and are not visibly obstructed by other electronic displays of the mobile device 102 or other features of the mobile device 102.

In the closed configuration of the mobile device 102 depicted by FIGS. 4-5 (also referred to herein as a folded configuration), the first electronic display 128 and the second electronic display 130 face outward and visibility of the first electronic display 128 and the second electronic display 130 is not obstructed. However, relative to the open configuration, the closed configuration includes the third electronic display 302 pivoted toward the fourth electronic display 304 such that the third electronic display 302 and the fourth electronic display 304 face each other and are approximately parallel to each other. In the closed configuration, an end 402 of the second electronic display 130 is arranged parallel and coplanar to an end 404 of the first electronic display 128. Similarly, the end 208 of the second electronic display 130 is arranged parallel and coplanar with the end 206 of the first electronic display 128, with the end 208 opposite to the end 402 and the end 206 opposite to the end 404. In this arrangement, the first electronic display 128 is offset from the second electronic display 130 across the pivot axis 134 (e.g., offset in a direction perpendicular to the pivot axis 134).

In the closed configuration, the illumination controller 112 can control the illumination output of the mobile device 102 such that the third electronic display 302 and the fourth electronic display 304 do not output illumination. Further, in the closed configuration, the third electronic display 302 and the fourth electronic display 304 can be controlled by the processor system 106 such that no content is displayed by the third electronic display 302 and the fourth electronic display 304. However, in the closed configuration, the first electronic display 128 and the second electronic display 130 face outward (e.g., away from each other), such that visibility of the first electronic display 128 and the second electronic display 130 is not obstructed. The electronic displays that face outward (e.g., away from each other) may be referred to herein as "outer" electronic displays, and the electronic displays that face inward (e.g., toward each other) may be referred to herein as "inner" electronic displays. In some implementations, the illumination controller 112 can control the electronic display 128 and the second electronic display 130 while the mobile device 102 is in the closed configuration to output illumination via the first electronic display 128 and the second electronic display 130. Further, the first electronic display 128 and the second electronic display 130 can be controlled by the processor system 106 to display content such as a GUI while the mobile device 102 is in the closed configuration.

In the self-standing configurations shown by FIGS. 6-9, the illumination controller 112 detects the orientation of the electronic displays via the output of the orientation detector 116 and controls illumination of the electronic displays based on the orientation. Controlling the illumination based on the orientation of the electronic displays can include, for example, increasing or decreasing an intensity of illumination output by one or more of the electronic displays based on the orientation. As one example, in configurations in which an angle between the third electronic display 302 and the fourth electronic display 304 is smaller (e.g., such that a spacing between the third electronic display 302 and the fourth electronic display 304 is smaller), the illumination controller 112 can increase the illumination output of the third electronic display 302 and/or the fourth electronic display 304 relative to configurations in which the angle is larger (e.g., such that the spacing between the displays is larger). As another example, controlling the illumination can include adjusting a color of the illumination based on the orientation (e.g., utilizing a blue color for smaller angles, such as angle 802 shown by FIG. 8, and an orange color for larger angles, such as angle 902 shown by FIG. 9, as one non-limiting example).

In one non-limiting example, the illumination output of the third electronic display 302 and the fourth electronic display 304 can be equal to twice the illumination output of the first electronic display 128 and the second electronic display 130. As another non-limiting example, the illumination controller 112 can control the illumination output of the third electronic display 302 and the fourth electronic display 304 to a particular intensity (e.g., ten lumens, fifteen lumens, etc.) while the first electronic display 128 and the second electronic display 130 are controlled to have no illumination output (e.g., zero lumens). Other examples are possible.

In self-standing configurations, the mobile device 102 is supported against a surface on which the mobile device 102 sits (e.g., surface 602) by the end 208 of the second electronic display 130 and the end 206 of the first electronic display 128. The end 206 may also be an end of the first housing 136, and the end 208 may also be an end of the second housing 138. In the self-standing configuration shown by FIG. 8, the first housing 136 and the second housing 138 are angled relative to each other by angle 802 such that the end 206 and the end 208 are spaced apart by length 804 in a direction parallel with surface 602. In the self-standing configuration shown by FIG. 9, the first housing 136 and the second housing 138 are angled relative to each other by angle 902, such that the end 206 and the end 208 are spaced apart by length 904. The illumination controller 112 controls the illumination output of the electronic displays of the device such that a portion 604 of the surface 602 can be illuminated by the electronic displays. In particular, the illumination controller 112 can control the illumination output of the third electronic display 302 and the fourth electronic display 304 to emit light that is incident to the surface 602 and illuminates the portion 604 of the surface 602 between the end 206 and the end 208.

Some of the light emitted by the fourth electronic display 304 can be directed toward the third electronic display 302 and the first housing 136, and some of the light emitted by the third electronic display 302 can be directed toward the fourth electronic display 304 and the second housing 138. However, the illumination controller 112 can control the first electronic display 128 and the second electronic display 130 such that light is not emitted by the first electronic display 128 and the second electronic display 130 while the mobile device 102 is in the self-standing configuration. In this way, the light emitted by the mobile device 102 can have a diffused quality that is not emitted directly toward a user of the mobile device 102, which can increase user comfort.

In some implementations, while the illumination controller 112 controls the third electronic display 302 and the fourth electronic display 304 to emit light toward the surface 602, the processor system 106 can control the first electronic display 128 and/or the second electronic display 130 to display media such as movies, text, games, etc. Thus, the mobile device 102 can provide diffuse illumination via the third electronic display 302 and the fourth electronic display 304 for visibility (e.g., in a dimly lit room), while the first electronic display 128 and the second electronic display 130 can display content for user entertainment or other purposes. For example, some users may fall asleep more easily while watching videos, listening to music, etc. By utilizing the first electronic display 128 and the second electronic display 130 for entertainment while the third electronic display 302 and the fourth electronic display 304 are controlled via the illumination controller 112 for diffuse illumination output, optimal sleeping conditions can be provided for some users, and user comfort may be increased.

In some implementations, a brightness or intensity of the display of the media at the first electronic display 128 and/or the second electronic display 130 can be adjusted by the illumination controller 112 based on the intensity of the illumination output at the third electronic display 302 and/or the fourth electronic display 304. For example, while the illumination output of the third electronic display 302 and the fourth electronic display 304 is decreased responsive to the user transitioning from being awake to being asleep, the brightness or intensity of the first electronic display 128 and the second electronic display 130 can also be decreased.

Figure 10:
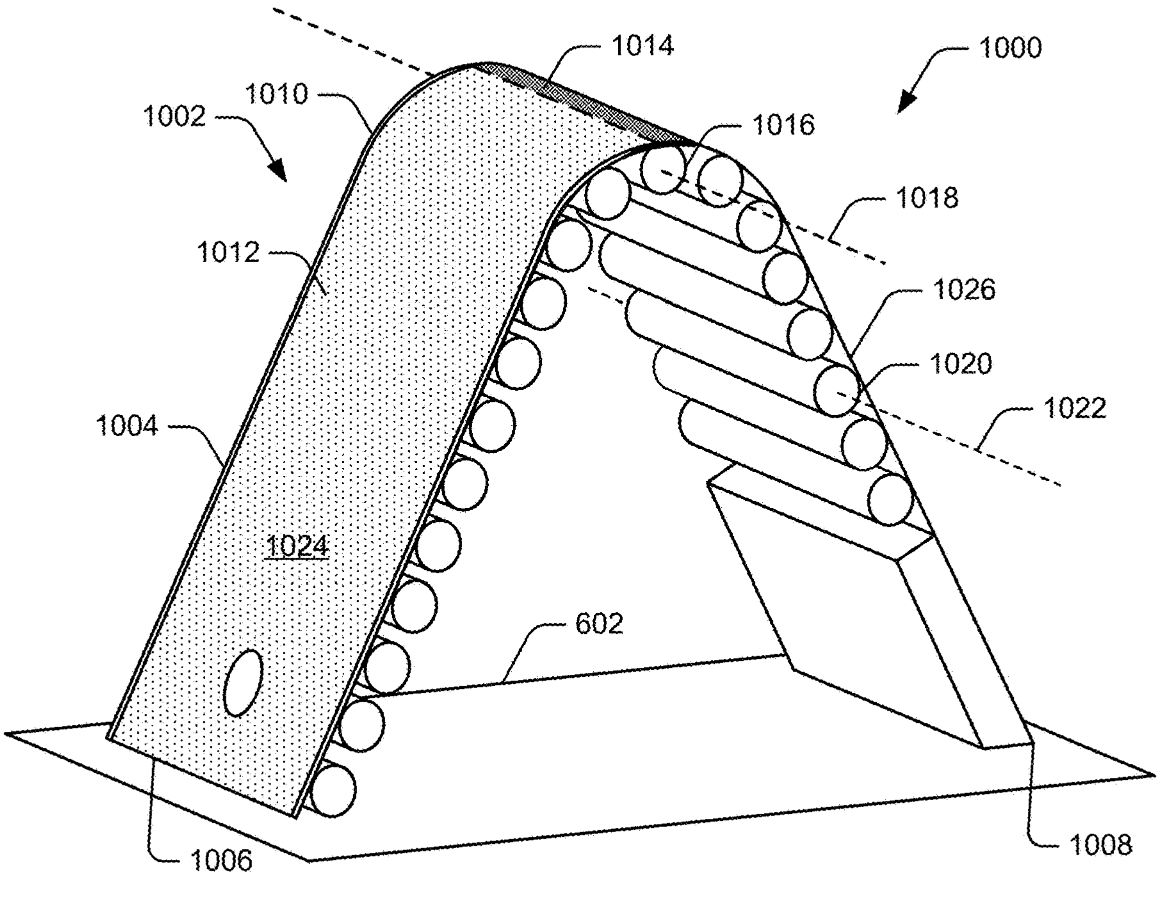
FIGS. 10-11 illustrate different views of another example of the mobile device that includes a flexible electronic display with contextual illumination in a self-standing configuration with the flexible electronic display curved outward, in accordance with one or more implementations as described herein.
Figure 11:
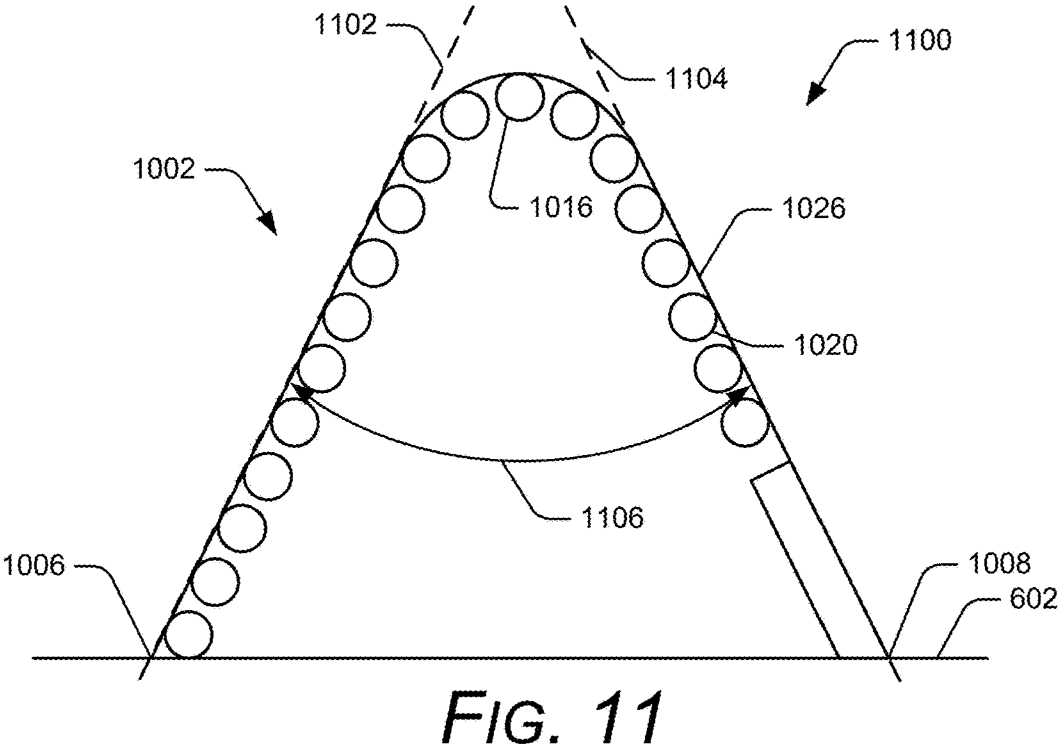
Figure 12:
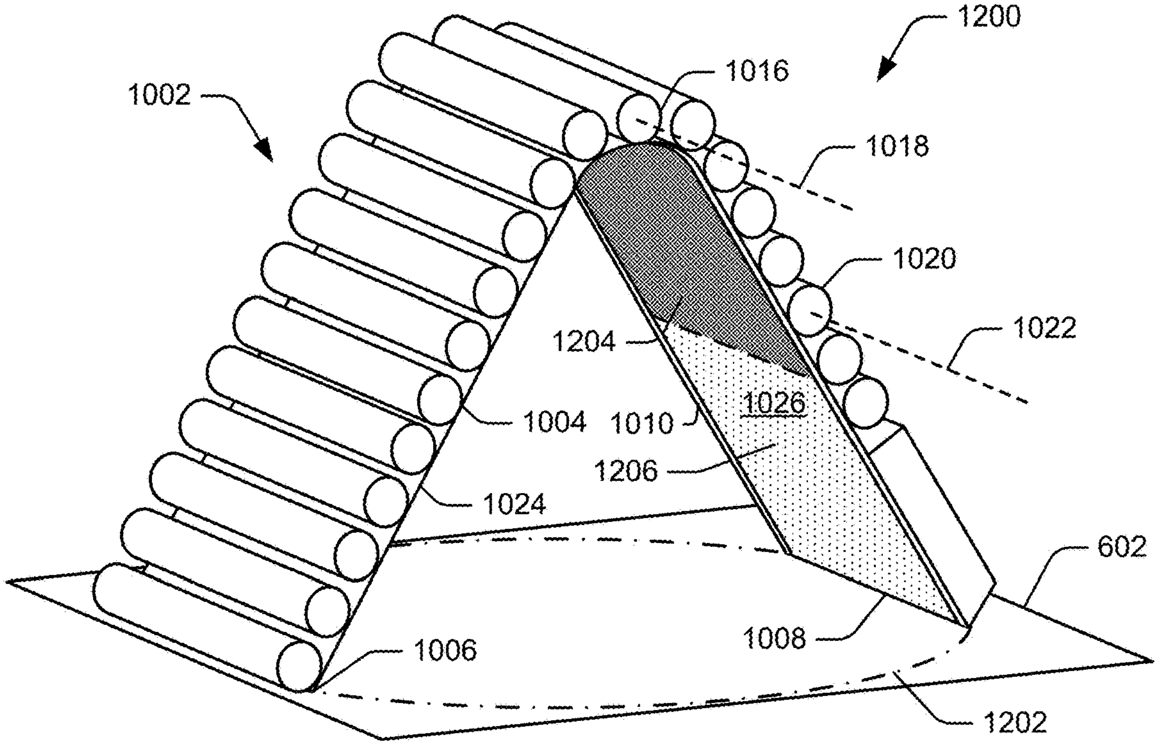
FIGS. 12-13 illustrate further different views of an example of the mobile device that includes a flexible electronic display with contextual illumination in a self-standing configuration with the flexible electronic display curved inward, in accordance with one or more implementations as described herein.
Figure 13:
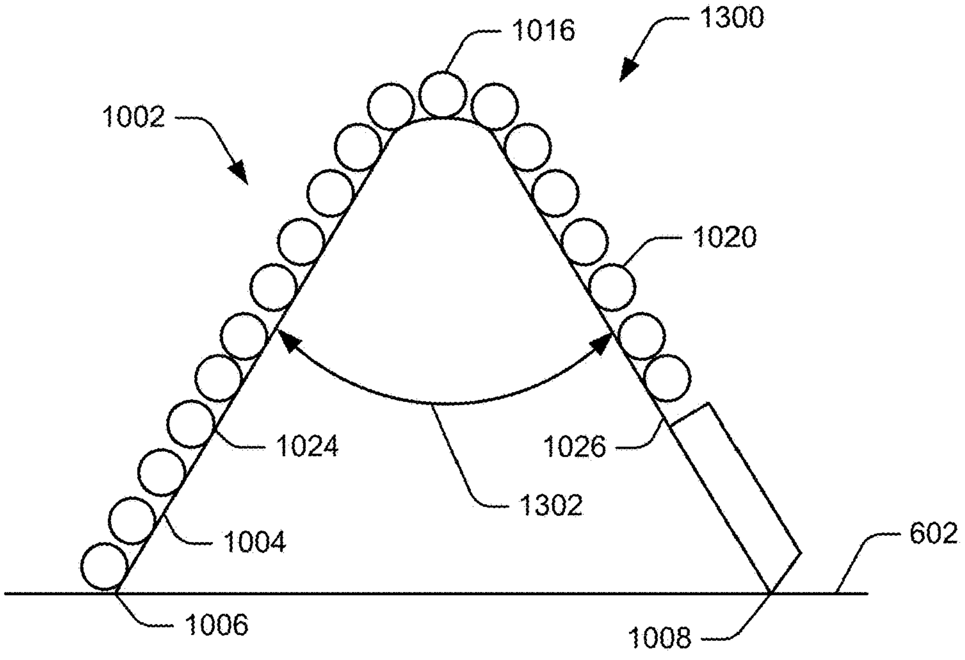

FIGS. 10-13 illustrate different views of another example of a mobile device 1002 that includes a flexible electronic display 1004 with contextual illumination in a self-standing configuration. In particular, FIGS. 10-11 depict view 1000 and view 1100, respectively, of the mobile device 1002 with the flexible electronic display 1004 curved outward. FIGS. 12-13 depict view 1200 and view 1300, respectively, of the mobile device 1002 with the flexible electronic display 1004 curved inward.

In the example shown, the mobile device 1002 sits on surface 602 and is supported in a self-standing configuration by a first end 1006 and a second end 1008 of the flexible electronic display 1004. The flexible electronic display 1004 is integrated with (e.g., mounted in) a flexible enclosure 1010 (also referred to herein as a housing) that supports bending the flexible electronic display 1004 to a variety of shapes, such as the self-standing configuration.

The mobile device 1002 can include several components similar to, or the same as, those described above with reference to the mobile device 102. For example, the mobile device 1002 includes illumination controller 112 configured to control the illumination output of the flexible electronic display 1004, as well as the associated components utilized in performing operations via the illumination controller 112. As an example, the mobile device 1002 includes the orientation detector 116, with the orientation detector 116 configured to detect an angle between opposing sides of the mobile device 1002 while the mobile device 1002 is in the self-standing configuration (e.g., with the orientation detector 116 employing a rotation sensor, position sensor, and/or curvature sensor to determine the angle). The angle can also represent the angle between opposing ends of the flexible electronic display 1004 (e.g., first end 1006 and second end 1008). The orientation detector 116 can detect whether the angle between the opposing sides is greater than a threshold angle or is within a threshold angle range to determine whether the mobile device 1002 is in the self-standing configuration, similar to the examples described above. As another example, the orientation detector 116 can detect a curvature of the flexible electronic display 1004 (and a direction of the curvature) and can compare the curvature to a threshold curvature to determine whether the mobile device 1002 is in the self-standing configuration.

In some implementations, the mobile device 1002 can include the flexible electronic display 1004 while other components are remote from the mobile device 1002. For example, the illumination controller 112 can be included in a unit separate and remote from the flexible electronic display 1004 and can communicate electronically with the flexible electronic display 1004 in order to adjust the illumination output of the flexible electronic display 1004 according to the techniques described herein. As one example, the illumination controller 112 can be included in a separate electronic device wearable by a user, and the separate electronic device can communicate via a wired or wireless connection with the flexible electronic display 1004 to control the illumination output of the flexible electronic display 1004.

In some implementations, the illumination controller 112 controls the illumination output of different sections of the flexible electronic display 1004 at different intensities and/or colors. For example, a first section 1012 and a second section 1014 of the flexible electronic display 1004 are depicted by FIG. 10. The illumination controller 112 can control the illumination output of each section independently, such that in some situations an intensity of light emitted by the first section 1012 is higher than an intensity of light emitted by the second section 1014, or vice versa.

The mobile device 1002 includes linkage members that reinforce a shape (e.g., curvature) of the flexible electronic display 1004. The flexible electronic display 1004 is bendable around each linkage member. In the configuration depicted by FIGS. 10-11, the flexible electronic display 1004 bends around a linkage member 1016 (e.g., around bend axis 1018 extending parallel with the linkage member 1016). In other configurations, the flexible electronic display 1004 can bend around a different linkage member (e.g., linkage member 1020 extending parallel with bend axis 1022). By bending around one or more of the linkage members, the flexible electronic display 1004 forms an arcuate shape between the first end 1006 and the second end 1008. The bend of the flexible electronic display 1004 in the self-standing configuration is shown by FIG. 11, where axis 1102 and axis 1104 are parallel to opposing sides of the flexible electronic display 1004 and the opposing sides are angled relative to each other by angle 1106. In particular, the axis 1102 is parallel with side 1024 of the flexible electronic display 1004, and the axis 1104 is parallel with side 1026 of the flexible electronic display 1004. The angle 1106 is one example angle between the opposing sides in the configuration shown. However, other angles are possible.

FIGS. 12-13 depict the mobile device 1002 in an alternative self-standing configuration. In the self-standing configuration shown by FIGS. 12-13, the flexible electronic display 1004 bends in an inward manner such that the side 1026 and the side 1024 face each other. The side 1026 and the side 1024 are angled relative to each other by angle 1302, which can be different than the angle 1106 described above. The flexible electronic display 1004 bends around the linkage member 1016 in an opposite direction to the bend depicted by FIGS. 10-11. In this configuration, the linkage members are spaced apart from the surface 602 by the flexible electronic display 1004 (e.g., the flexible electronic display 1004 is arranged between the surface 602 and the linkage members). By facing the flexible electronic display 1004 inward as shown by FIGS. 12-13 instead of outward as shown by FIGS. 10-11, light emitted by the flexible electronic display 1004 is directed toward the surface 602 on which the mobile device 1002 sits. As a result, a portion 1202 of the surface 602 is illuminated (e.g., light emitted by the flexible electronic display 1004 is incident to the portion 1202). Further, light emitted from the flexible electronic display 1004 at the side 1024 is directed toward the side 1026, and light emitted by the side 1026 is directed toward the side 1024. As a result, the overall light emission from the mobile device 1002 can have a more diffuse quality.

The illumination controller 112 controls the light emission from the flexible electronic display 1004 in a manner similar to that described above with reference to the mobile device 102. In some implementations, different sections of the flexible electronic display 1004 can be controlled to have a different illumination output (e.g., a different intensity of emitted light). For example, a first section 1204 of the flexible electronic display 1004 can have a different illumination output than a second section 1206 of the flexible electronic display 1004. By controlling the illumination output in this way, the light emitted by the flexible electronic display 1004 can be highly customizable to accommodate a variety of different situations (e.g., directing more light toward one portion of the surface 602 than another portion). For example, the different illumination outputs can increase user comfort a user of the mobile device 1002 is in a space shared by other individuals (e.g., by directing light in a direction that aids the vision of the user while being unobtrusive to other individuals).

Figure 14:
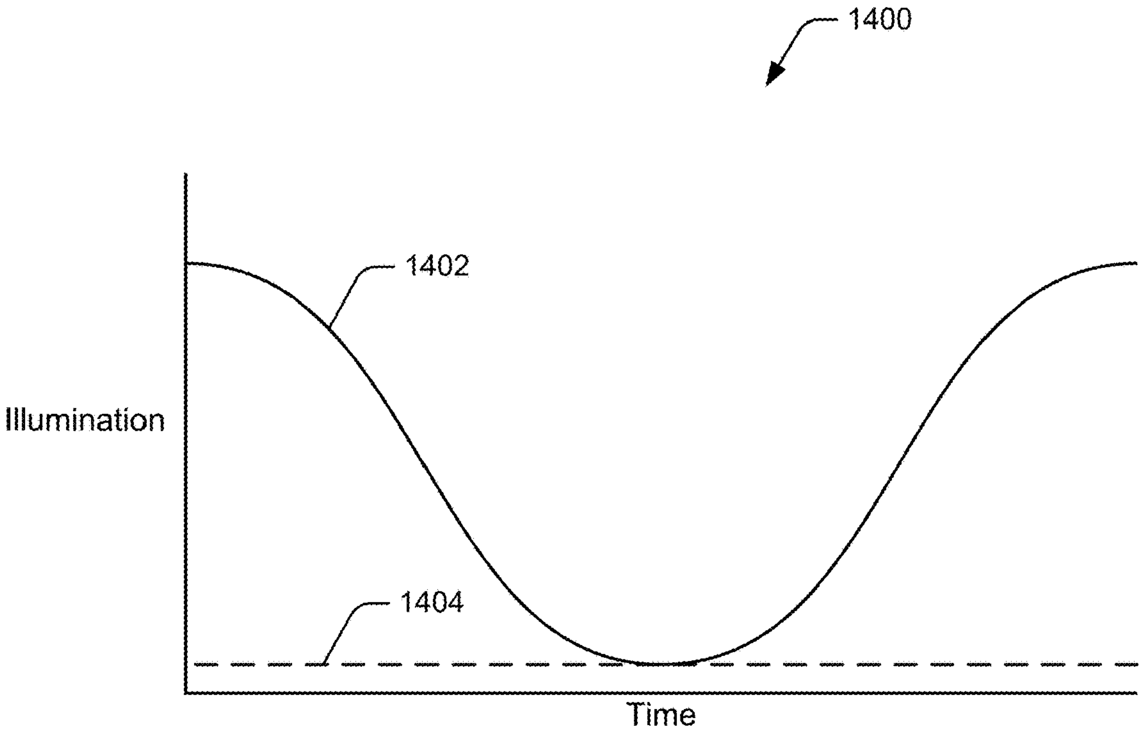
FIGS. 14-15 illustrate graphs including plots depicting an illumination output of a mobile device that includes a flexible electronic display with contextual illumination, in accordance with one or more implementations as described herein.
Figure 15:
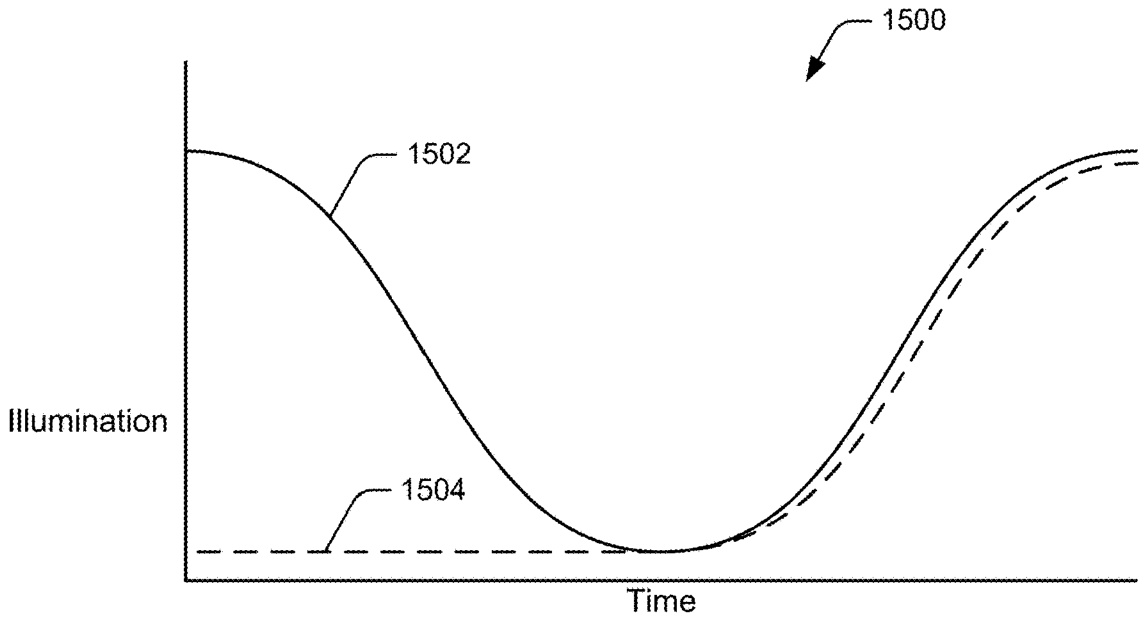

FIGS. 14-15 illustrate graphs including plots depicting an illumination output of a mobile device that includes a flexible electronic display with contextual illumination, in accordance with one or more implementations as described herein. In some implementations, the mobile device can be the mobile device 102 or the mobile device 1002 described above. The mobile device utilizes the illumination controller 112 and other components employed for controlling illumination output via the illumination controller 112 as described above.

FIG. 14 depicts graph 1400 including a plot 1402 and a plot 1404. The graph 1400 depicts illumination output (e.g., light emission intensity) in the direction of the vertical axis and time in the direction of the horizontal axis. Each of the graph 1400 and the graph 1500 depict illumination output that occurs while the mobile device is in a self-standing configuration, such as the self-standing configurations depicted by FIGS. 6-13.

The plot 1402 depicts an illumination output of one or more electronic displays of the mobile device that face each other and are angled toward a surface on which the mobile device sits while the mobile device is in the self-standing configuration. In some implementations, the illumination output depicted by plot 1402 can correspond to the illumination output of the third electronic display 302 and the fourth electronic display 304 in the configuration depicted by FIGS. 6-9. In other implementations, the illumination output depicted by plot 1402 can correspond to the illumination output of flexible electronic display 1004 in the configuration depicted by FIGS. 12-13.

The plot 1404 depicts an illumination output of one or more electronic displays of the mobile device that face away from each other and are angled away from the surface on which the mobile device sits while the mobile device is in the self-standing configuration. In some implementations, the illumination output depicted by plot 1404 can correspond to the illumination output of the first electronic display 128 and the second electronic display 130 in the configuration depicted by FIGS. 6-9.

As depicted by the graph 1400, the illumination output indicated by plot 1402 starts at a relatively high level, which can correspond to the illumination controller 112 determining that the mobile device is in the self-standing configuration (e.g., based on an angle and/or curvature of electronic displays of the mobile device) and determining that a user of the device is awake (e.g., not sleeping and in the awake stage). As the user transitions to a sleep stage (such as a transitional sleep stage, or the deep sleep stage associated with rapid eye movement), the illumination controller 112 accordingly reduces the illumination output of the one or more electronic displays facing each other. As time progresses, the illumination controller 112 detects that the user transitions from the sleep stage to the awake stage, and as a result, the illumination controller 112 accordingly increases the illumination output of the one or more electronic displays facing each other as indicated by plot 1402.

In the example depicted by FIG. 14, the illumination output of the one or more electronic displays facing away from each other is maintained (e.g., in a deactivated condition in which no light is emitted from the one or more electronic displays facing away from each other). Concurrently, the illumination output of the one or more electronic displays facing toward each other is adjusted as described above.

FIG. 15 depicts another example including plot 1502 and plot 1504. The plot 1502 depicts an illumination output of one or more electronic displays of a mobile device that face each other, and the plot 1504 depicts an illumination output of one or more electronic displays of the mobile device that face away from each other. In this example, the illumination controller 112 maintains the illumination output of the one or more electronic displays that face away from each other at a low output (or zero output) until the illumination controller 112 begins to increase the illumination output of the one or more electronic displays that face each other (as indicated by plot 1502). The illumination controller 112 then increases the illumination output of the one or more electronic displays that face away from each other at a similar rate.

Figure 16:
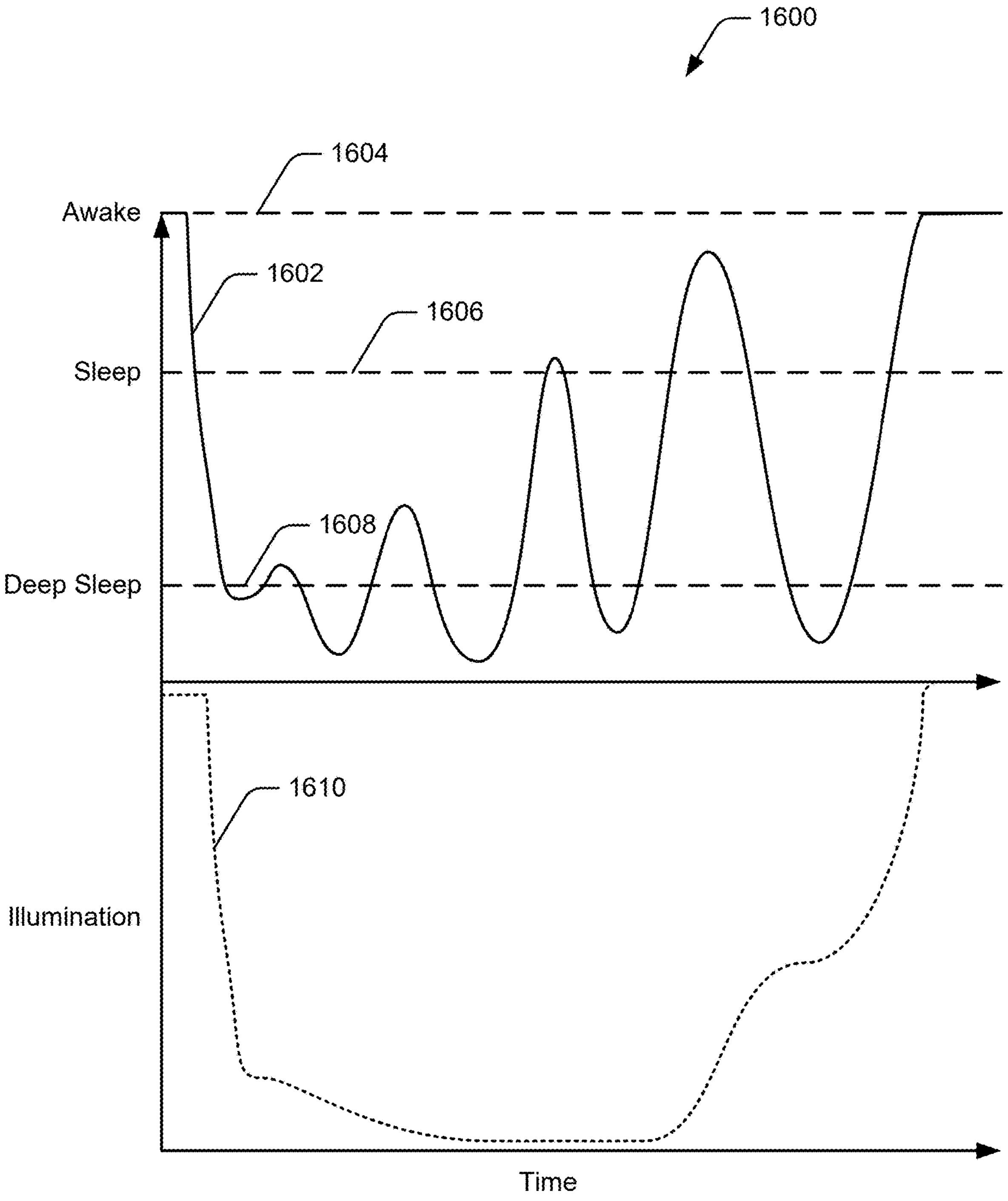
FIG. 16 illustrates a graph including plots depicting an illumination output of a mobile device that includes a flexible electronic display with contextual illumination based on one or more illumination control parameters, in accordance with one or more implementations as described herein.

FIG. 16 illustrates a graph 1600 including plots depicting an illumination output of a mobile device that includes a flexible electronic display with contextual illumination based on one or more illumination control parameters, in accordance with one or more implementations as described herein. In some implementations, the mobile device can be the mobile device 102 or the mobile device 1002 described above. The mobile device utilizes the illumination controller 112 and other components employed for controlling illumination output via the illumination controller 112 as described above.

The plot 1602 depicts a detected sleep stage of a user of the mobile device while the mobile device is in the self-standing configuration. Threshold 1604 depicts the "awake" stage, threshold 1606 depicts a transitional sleep stage also referred to as the "asleep" stage (e.g., a stage in which the user sleeps without rapid eye movement), and threshold 1608 depicts the "deep sleep" stage (e.g., the stage in which the user sleeps with rapid eye movement). The plot 1610 depicts an illumination output of the mobile device throughout the various stages. In some implementations, the illumination output depicted by plot 1610 corresponds to illumination output of one or more electronic displays of the mobile device that face each other. As depicted, the illumination output generally decreases as the user transitions toward the deep sleep stage, and the illumination output generally increases as the user transitions from a sleep stage (e.g., the deep sleep stage) toward a non-sleeping stage (e.g., the awake stage).

Example method 1700 is described with reference to respective FIGS. 1-16 in accordance with one or more implementations of, as described herein. Generally, any services, components, modules, managers, controllers, methods, and/or operations described herein can be implemented using software, firmware, hardware (e.g., fixed logic circuitry), manual processing, or any combination thereof.

Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 17:
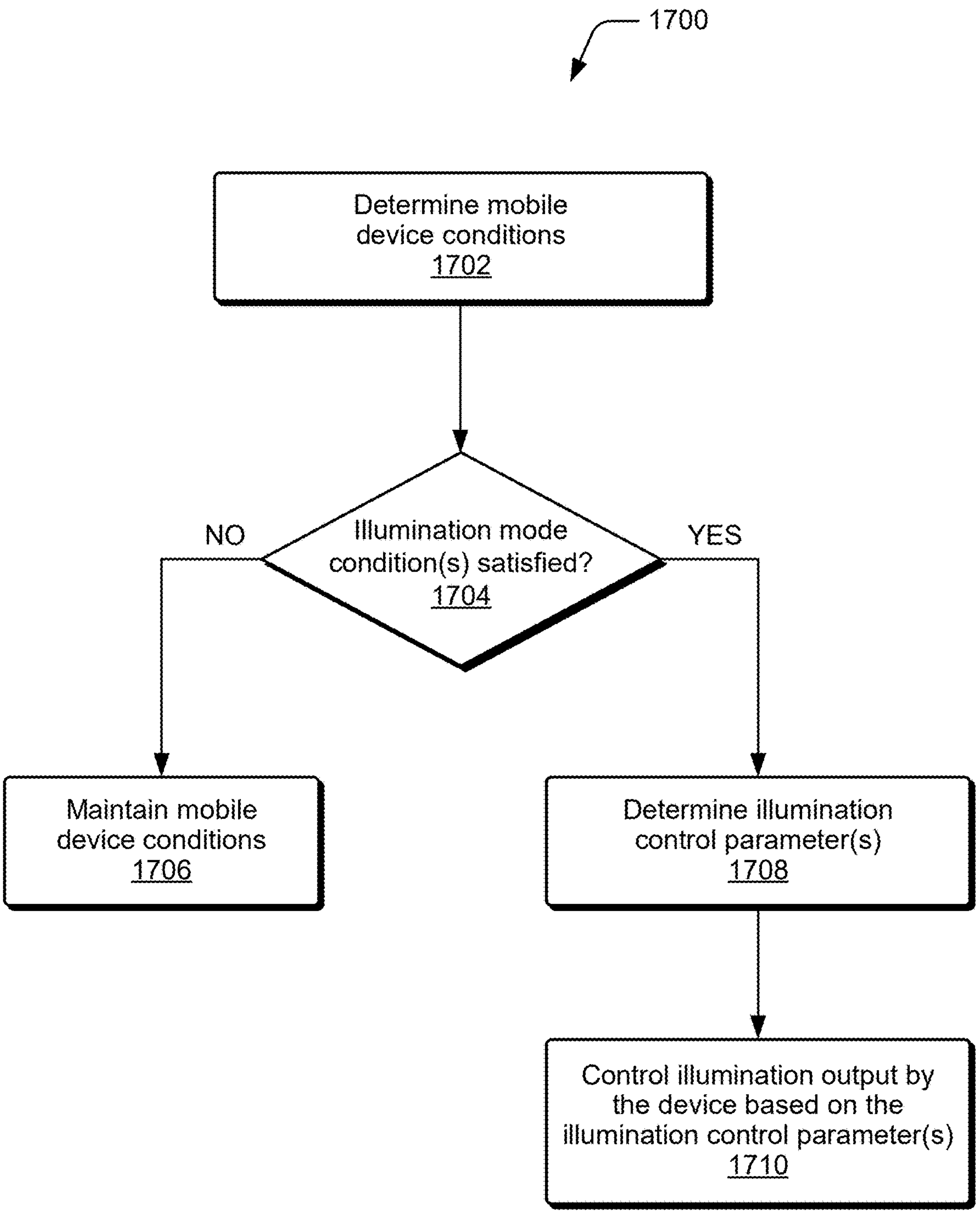
FIG. 17 illustrates an example method for a flexible electronic display with contextual illumination, in accordance with one or more implementations as described herein.

FIG. 17 illustrates an example method 1700 for a flexible electronic display with contextual illumination. The order in which the method is described is not intended to be construed as a limitation, and any number or combination of the described method operations may be performed in any order to perform a method, or an alternate method.

At 1702, conditions of a mobile device are determined. For example, the conditions can include conditions such as a current content displayed by electronic displays of the mobile device, a current illumination output of the mobile device, a location of the mobile device, an orientation of the mobile device, and so forth.

At 1704, a determination is made as to whether one or more illumination mode conditions are satisfied. For example, the illumination mode conditions can include at least the orientation of the mobile device. An illumination mode condition can be satisfied, for example, responsive to determining that the mobile device is in the self-standing configuration as described above. As another example, an illumination mode condition can be satisfied if detected location of the mobile device is within a threshold distance of a particular location (e.g., a nightstand of a user of the mobile device).

If the one or more illumination mode conditions are not satisfied at 1704, the mobile device conditions are maintained at 1706. For example, maintaining the mobile device conditions can include not adjusting the illumination output of the mobile device.

However, if the one or more illumination mode conditions are satisfied at 1704, one or more illumination control parameters are determined at 1708. As one example, an illumination control parameter can be an amount of ambient light around the mobile device. As another example, an illumination control parameter can include a sleep stage of a user (e.g., whether the user is in the awake stage, a transitional sleep stage, or the deep sleep stage). As yet another example, an illumination control parameter can include an angle between electronic displays of the mobile device while the mobile device is in the self-standing configuration.

At 1710, an illumination output by the mobile device is controlled based on the one or more illumination control parameters. For example, the illumination output can be increased during conditions in which the user transitions from being asleep (e.g., in a transitional sleep stage or the deep sleep stage) toward being awake, and the illumination output can be decreased during conditions in which the user transitions from being awake toward being asleep (e.g., similar to the examples described above with reference to FIGS. 14-16). As another example, the illumination output can be increased or decreased based on an amount of ambient light around the mobile device. As yet another example, the illumination output can be increased or decreased based on the angle between electronic displays of the mobile device. As yet another example, a color of the illumination output can be adjusted based on the user condition, the ambient light, and/or the angle between the electronic displays.

Figure 18:
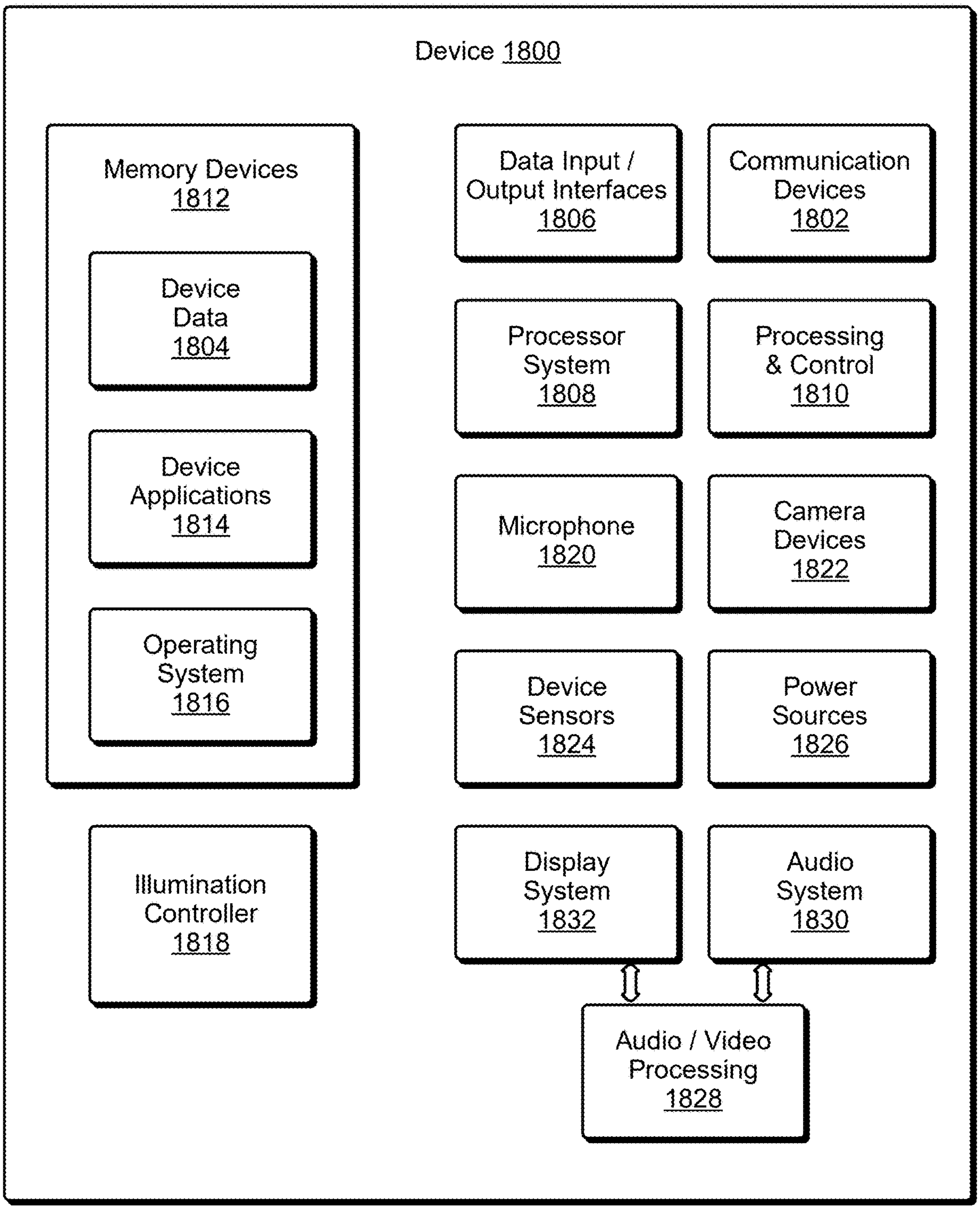
FIG. 18 illustrates various components of an example device that may be used to implement the techniques for a flexible electronic display with contextual illumination as described herein.

FIG. 18 illustrates various components of an example device 1800, which can implement aspects of the techniques and features for a flexible electronic display with contextual illumination, as described herein.

The example device 1800 can be implemented as any of the devices described with reference to the previous FIGS. 1-17, such as any type of a wireless device, mobile device, mobile phone, flip phone, client device, companion device, display device, tablet, computing, communication, entertainment, gaming, media playback, and/or any other type of computing, consumer, and/or electronic device. For example, the mobile device 102 described with reference to FIGS. 1-17 can be implemented as the example device 1800.

The example device 1800 can include various, different communication devices 1802 that enable wired and/or wireless communication of device data 1804 with other devices. The device data 1804 can include any of the various device data and content that is generated, processed, determined, received, stored, and/or communicated from one computing device to another. Generally, the device data 1804 can include any form of audio, video, image, graphics, and/or electronic data that is generated by applications executing on a device. The communication devices 1802 can also include transceivers for cellular phone communication and/or for any type of network data communication.

The example device 1800 can also include various, different types of data input/output (I/O) interfaces 1806, such as data network interfaces that provide connection and/or communication links between the devices, data networks, and other devices. The data I/O interfaces 1806 can be used to couple the device to any type of components, peripherals, and/or accessory devices, such as a computer input device that can be integrated with the example device 1800. The I/O interfaces 1806 can also include data input ports via which any type of data, information, media content, communications, messages, and/or inputs can be received, such as user inputs to the device, as well as any type of audio, video, image, graphics, and/or electronic data received from any content and/or data source.

The example device 1800 includes a processor system 1808 of one or more processors (e.g., any of microprocessors, controllers, and the like) and/or a processor and memory system implemented as a system-on-chip (SoC) that processes computer-executable instructions. The processor system 1808 can be implemented at least partially in computer hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively, or in addition, the device can be implemented with any one or combination of software, hardware, firmware, or fixed logic circuitry that can be implemented in connection with processing and control circuits, which are generally identified at 1810. The example device 1800 can also include any type of a system bus or other data and command transfer system that couples the various components within the device. A system bus can include any one or combination of different bus structures and architectures, as well as control and data lines.

The example device 1800 also includes memory and/or memory devices 1812 (e.g., computer-readable storage memory) that enable data storage, such as data storage devices implemented in hardware which can be accessed by a computing device, and that provide persistent storage of data and executable instructions (e.g., software applications, programs, functions, and the like). Examples of the memory devices 1812 include volatile memory and non-volatile memory, fixed and removable media devices, and any suitable memory device or electronic data storage that maintains data for computing device access. The memory devices 1812 can include various implementations of random-access memory (RAM), read-only memory (ROM), flash memory, and other types of storage media in various memory device configurations. The example device 1800 can also include a mass storage media device.

The memory devices 1812 (e.g., as computer-readable storage memory) provide data storage mechanisms, such as to store the device data 1804, other types of information and/or electronic data, and various device applications 1814 (e.g., software applications and/or modules). For example, an operating system 1816 can be maintained as software instructions with a memory device 1812 and executed by the processor system 1808 as a software application. The device applications 1814 can also include a device manager, such as any form of a control application, software application, signal-processing and control module, code that is specific to a particular device, a hardware abstraction layer for a particular device, and so on.

In this example, the device 1800 includes an illumination controller 1818 that implements various aspects of the described features and techniques described herein. The illumination controller 1818 can be implemented with hardware components and/or in software as one of the device applications 1814, such as when the example device 1800 is implemented as the mobile device 102 described with reference to FIGS. 1-9 and/or the mobile device 1002 described with reference to FIGS. 10-13. An example of the illumination controller 1818 is the illumination controller 112 implemented by the mobile device 102, such as a software application and/or as hardware components in the mobile device. In implementations, the illumination controller 1818 can include independent processing, memory, and logic components as a computing and/or electronic device integrated with the example device 1800.

The example device 1800 can also include a microphone 1820 (e.g., to capture an audio recording of a user) and/or camera devices 1822 (e.g., to capture video images of the user during a call), as well as device sensors 1824, which can be implemented as components of an inertial measurement unit (IMU). The device sensors 1824 can be implemented with various sensors, such as a gyroscope, an accelerometer, and/or other types of motion sensors to sense motion of the device. The device sensors 1824 can generate sensor data vectors having three-dimensional parameters (e.g., rotational vectors in x, y, and z-axis coordinates) indicating location, position, acceleration, rotational speed, and/or orientation of the device. The example device 1800 can also include one or more power sources 1826, such as when the device is implemented as a wireless device and/or a mobile device. The power sources can include a charging and/or power system, and can be implemented as a flexible strip battery, a rechargeable battery, a charged super-capacitor, and/or any other type of active or passive power source.

The example device 1800 can also include an audio and/or video processing system 1828 that generates audio data for an audio system 1830 and/or generates display data for a display system 1832. The audio system and/or the display system can include any types of devices or modules that generate, process, display, and/or otherwise render audio, video, display, and/or image data. Display data and audio signals can be communicated to an audio component and/or to a display component via any type of audio and/or video connection or data link. In implementations, the audio system and/or the display system are integrated components of the example device 1800. Alternatively, the audio system and/or the display system are external, peripheral components to the example device.

Although implementations for a flexible electronic display with contextual illumination have been described in language specific to features and/or methods, the appended claims are not necessarily limited to the specific features or methods described. Rather, the specific features and methods are disclosed as example implementations for a flexible electronic display with contextual illumination, and other equivalent features and methods are intended to be within the scope of the appended claims. Further, various different examples are described, and it is to be appreciated that each described example can be implemented independently or in connection with one or more other described examples.

In some aspects, the techniques described herein relate to a mobile device, including: a flexible electronic display integrated in a flexible housing of the mobile device, the flexible housing enabling the flexible electronic display to bend into a self-standing configuration; and an illumination controller configured to control an illumination output of the flexible electronic display in the self-standing configuration based at least in part on one or more illumination control parameters.

In some aspects, the techniques described herein relate to a mobile device, wherein the one or more illumination control parameters include at least a sensor indication of ambient light and a location of the mobile device.

In some aspects, the techniques described herein relate to a mobile device, further including a sensor configured to detect a curvature of the flexible electronic display.

In some aspects, the techniques described herein relate to a mobile device, wherein the illumination controller is configured to determine that the flexible electronic display is in the self-standing configuration based at least in part on the curvature detected by the sensor being greater than a threshold curvature.

In some aspects, the techniques described herein relate to a mobile device, wherein the illumination controller is configured to determine that the flexible electronic display is in the self-standing configuration based at least in part on an angle between a first section of the flexible electronic display and a second section of the flexible electronic display being within a threshold angle range.

In some aspects, the techniques described herein relate to a mobile device, wherein the one or more illumination control parameters include an indication of a sleep stage of a user, and the illumination controller is configured to one of increase the illumination output responsive to the sleep stage transitioning to an awake stage of the user, or decrease the illumination output responsive to the user transitioning from the awake stage to the sleep stage.

In some aspects, the techniques described herein relate to a mobile device, wherein different sections of the flexible electronic display bend around a linkage member and face each other in the self-standing configuration, and the illumination controller is configured to control the illumination output of each section of the flexible electronic display independent of each other section.

In some aspects, the techniques described herein relate to a mobile device, wherein the illumination controller is configured to control the illumination output to direct light emitted by the flexible electronic display toward opposing ends of the flexible electronic display.

In some aspects, the techniques described herein relate to a mobile device, wherein the illumination controller controls a color of the illumination output based on the one or more illumination control parameters.

In some aspects, the techniques described herein relate to a mobile device, wherein, in the self-standing configuration, the flexible electronic display faces a surface on which the mobile device is located.

In some aspects, the techniques described herein relate to a mobile device, wherein the illumination controller is configured to control the illumination output to emit light from the flexible electronic display in a direction toward a surface on which the flexible electronic display is located in the self-standing configuration.

In some aspects, the techniques described herein relate to a method, including: determining one or more illumination control parameters for a flexible electronic display in a self-standing configuration; and controlling an illumination output of the flexible electronic display based at least in part on the one or more illumination control parameters in the self-standing configuration of the flexible electronic display.

In some aspects, the techniques described herein relate to a method, further including determining the self-standing configuration of the flexible electronic display based on a curvature of the flexible electronic display.

In some aspects, the techniques described herein relate to a method, further including determining a sleep stage of a user based at least in part on the one or more illumination control parameters; and at least one of: increasing the illumination output responsive to the sleep stage transitioning to an awake stage of the user; or decreasing the illumination output responsive to the user transitioning from the awake stage to the sleep stage.

In some aspects, the techniques described herein relate to a method, wherein controlling the illumination output includes directing emitted light from one or more sections of the flexible electronic display toward opposing ends of the flexible electronic display.

In some aspects, the techniques described herein relate to a method, wherein controlling the illumination output includes directing emitted light from one or more sections of the flexible electronic display toward a surface on which the flexible electronic display is located.

In some aspects, the techniques described herein relate to a mobile device, including: a flexible electronic display bendable to a self-standing configuration; at least one memory; and at least one processor coupled with the at least one memory and configured to cause the mobile device to: determine one or more illumination control parameters associated with the self-standing configuration; and control an illumination output of the flexible electronic display in the self-standing configuration based at least in part on the one or more illumination control parameters.

In some aspects, the techniques described herein relate to a mobile device, wherein the at least one processor is configured to cause the mobile device to determine the self-standing configuration based on a curvature of the flexible electronic display.

In some aspects, the techniques described herein relate to a mobile device, wherein the at least one processor is configured to cause the mobile device to: determine a sleep stage of a user based at least in part on the one or more illumination control parameters; and one of increase the illumination output responsive to the sleep stage transitioning to an awake stage of the user, or decrease the illumination output responsive to the user transitioning from the awake stage to the sleep stage.

In some aspects, the techniques described herein relate to a mobile device, wherein the at least one processor is configured to cause the mobile device to emit light from the flexible electronic display toward a surface on which the mobile device is located in the self-standing configuration.

What is claimed is:

1. A mobile device, comprising:

a flexible electronic display integrated in a flexible housing of the mobile device, the flexible housing enabling the flexible electronic display to bend into a self-standing configuration; and an illumination controller configured to control an illumination output of the flexible electronic display in the self-standing configuration based at least in part on one or more illumination control parameters, wherein the one or more illumination control parameters include an indication of a sleep stage of a user.

2. The mobile device of claim 1, wherein the one or more illumination control parameters include at least a sensor indication of ambient light and a location of the mobile device.

3. The mobile device of claim 1, further comprising a sensor configured to detect a curvature of the flexible electronic display.

4. The mobile device of claim 3, wherein the illumination controller is configured to determine that the flexible electronic display is in the self-standing configuration based at least in part on the curvature detected by the sensor being greater than a threshold curvature.

5. The mobile device of claim 3, wherein the illumination controller is configured to determine that the flexible electronic display is in the self-standing configuration based at least in part on an angle between a first section of the flexible electronic display and a second section of the flexible electronic display being within a threshold angle range.

6. The mobile device of claim 1, wherein the illumination controller is configured to one of increase the illumination output responsive to the sleep stage transitioning to an awake stage of the user, or decrease the illumination output responsive to the user transitioning from the awake stage to the sleep stage.

7. The mobile device of claim 1, wherein different sections of the flexible electronic display bend around a linkage member and face each other in the self-standing configuration, and the illumination controller is configured to control the illumination output of each section of the flexible electronic display independent of each other section.

8. The mobile device of claim 1, wherein the illumination controller is configured to control the illumination output to direct light emitted by the flexible electronic display toward opposing ends of the flexible electronic display.

9. The mobile device of claim 1, wherein the illumination controller controls a color of the illumination output based on the one or more illumination control parameters.

10. The mobile device of claim 1, wherein, in the self-standing configuration, the flexible electronic display faces a surface on which the mobile device is located.

11. The mobile device of claim 1, wherein the illumination controller is configured to control the illumination output to emit light from the flexible electronic display in a direction toward a surface on which the flexible electronic display is located in the self-standing configuration.

12. A method, comprising:

determining one or more illumination control parameters for a flexible electronic display in a self-standing configuration, the one or more illumination control parameters including an indication of a sleep stage of a user; and controlling an illumination output of the flexible electronic display based at least in part on the one or more illumination control parameters in the self-standing configuration of the flexible electronic display.

13. The method of claim 12, further comprising determining the self-standing configuration of the flexible electronic display based on a curvature of the flexible electronic display.

14. The method of claim 12, further comprising at least one of:

increasing the illumination output responsive to the sleep stage transitioning to an awake stage of the user; or decreasing the illumination output responsive to the user transitioning from the awake stage to the sleep stage.

15. The method of claim 12, wherein controlling the illumination output includes directing emitted light from one or more sections of the flexible electronic display toward opposing ends of the flexible electronic display.

16. The method of claim 12, wherein controlling the illumination output includes directing emitted light from one or more sections of the flexible electronic display toward a surface on which the flexible electronic display is located.

17. A mobile device, comprising:

a flexible electronic display bendable to a self-standing configuration;

at least one memory; and at least one processor coupled with the at least one memory and configured to cause the mobile device to:

determine one or more illumination control parameters associated with the self-standing configuration, the one or more illumination control parameters including an indication of a sleep stage of a user; and control an illumination output of the flexible electronic display in the self-standing configuration based at least in part on the one or more illumination control parameters.

18. The mobile device of claim 17, wherein the at least one processor is configured to cause the mobile device to determine the self-standing configuration based on a curvature of the flexible electronic display.

19. The mobile device of claim 17, wherein the at least one processor is configured to cause the mobile device to one of increase the illumination output responsive to the sleep stage transitioning to an awake stage of the user, or decrease the illumination output responsive to the user transitioning from the awake stage to the sleep stage.

20. The mobile device of claim 17, wherein the at least one processor is configured to cause the mobile device to emit light from the flexible electronic display toward a surface on which the mobile device is located in the self-standing configuration.

* * * * *